United States Patent
D'Alessandro

(10) Patent No.: US 12,271,930 B2
(45) Date of Patent: Apr. 8, 2025

(54) METHOD AND APPARATUS FOR AUTOMATED INTER-ACCOUNT INTERACTIONS

(71) Applicant: LIVEPERSON, INC., New York, NY (US)

(72) Inventor: Angelo D'Alessandro, Studio City, CA (US)

(73) Assignee: LIVEPERSON, INC., New York, NY (US)

(*) Notice: Subject to any disclaimer, the term of this patent is extended or adjusted under 35 U.S.C. 154(b) by 0 days.

(21) Appl. No.: 18/198,923

(22) Filed: May 18, 2023

(65) Prior Publication Data

US 2023/0289850 A1    Sep. 14, 2023

Related U.S. Application Data

(63) Continuation of application No. 17/537,109, filed on Nov. 29, 2021, now abandoned.

(60) Provisional application No. 63/119,264, filed on Nov. 30, 2020.

(51) Int. Cl.
| | |
|---|---|
| G06Q 30/0279 | (2023.01) |
| G06N 20/00 | (2019.01) |
| G06Q 10/1093 | (2023.01) |
| G06Q 20/02 | (2012.01) |
| G06Q 20/10 | (2012.01) |
| G06Q 20/12 | (2012.01) |
| G06Q 20/40 | (2012.01) |
| G06Q 30/01 | (2023.01) |

(52) U.S. Cl.
CPC ........ *G06Q 30/0279* (2013.01); *G06N 20/00* (2019.01); *G06Q 10/1093* (2013.01); *G06Q 20/02* (2013.01); *G06Q 20/10* (2013.01); *G06Q 20/12* (2013.01); *G06Q 20/40* (2013.01)

(58) Field of Classification Search
None
See application file for complete search history.

(56) References Cited

U.S. PATENT DOCUMENTS

| | | | | |
|---|---|---|---|---|
| 11,019,451 B2* | 5/2021 | Trivedi | ............. | H04L 67/55 |
| 11,140,102 B1* | 10/2021 | Bax | ............. | H04L 67/535 |
| 11,315,082 B2* | 4/2022 | Vaananen | ......... | H04M 1/72403 |

(Continued)

*Primary Examiner* — Jamie H Austin
(74) *Attorney, Agent, or Firm* — POLSINELLI LLP

(57) ABSTRACT

A system for automated account interaction has access to information about asset accounts, and receives transaction indications indicating transactions made by those accounts. The system automatically selects a first transaction indication for a first transaction made using a first asset account, for instance based on location, time, asset quantity, randomization, and/or a trained machine learning model. The system automatically selects a second asset account associated with a second user, for instance based on the second user's location, account balance, randomization, and/or a trained machine learning model. The system automatically transfers an asset quantity from the second asset account to the first asset account, and communicates an indicator indicating transfer completion. The asset quantity can be the quantity corresponding to the first transaction, or a portion thereof. The confirmation indicator can be sent to device(s) associated with either or both account(s) and/or can be published to a feed, graph, and/or index.

51 Claims, 13 Drawing Sheets

(56) References Cited

U.S. PATENT DOCUMENTS

| | | | | |
|---|---|---|---|---|
| 2014/0304023 | A1* | 10/2014 | Li | G06Q 10/1097 705/7.21 |
| 2016/0275458 | A1* | 9/2016 | Meushar | G06Q 10/109 |
| 2016/0350721 | A1* | 12/2016 | Comerford | H04L 67/306 |
| 2017/0132019 | A1* | 5/2017 | Karashchuk | G06F 3/0482 |
| 2017/0272268 | A1* | 9/2017 | Li | H04L 67/141 |
| 2017/0372268 | A1* | 12/2017 | Ilan et al. | G06N 20/00 |
| 2018/0285975 | A1* | 10/2018 | Ewanio | G06F 16/9535 |
| 2018/0341926 | A1* | 11/2018 | Gentzkow | G06Q 10/1095 |
| 2020/0274726 | A1* | 8/2020 | Setteboun | G06F 3/04817 |
| 2020/0349181 | A1* | 11/2020 | Carbune | G06F 16/93 |
| 2020/0349527 | A1* | 11/2020 | Malchikov | G06N 20/00 |
| 2020/0356875 | A1* | 11/2020 | Wang | G06N 5/04 |
| 2020/0387819 | A1* | 12/2020 | Rogynskyy | H04L 51/212 |
| 2021/0027771 | A1* | 1/2021 | Hall | G06F 16/3344 |
| 2021/0065693 | A1* | 3/2021 | Sharifi | G06F 3/167 |
| 2021/0233036 | A1* | 7/2021 | Zarakas | G06F 9/542 |
| 2021/0243412 | A1* | 8/2021 | Owen | G16H 10/20 |
| 2021/0248565 | A1* | 8/2021 | Vukich | G06Q 10/1095 |
| 2021/0328948 | A1* | 10/2021 | Bax | H04L 51/52 |
| 2021/0344624 | A1* | 11/2021 | Gray | H04L 51/046 |
| 2021/0368015 | A1* | 11/2021 | Wilson | H04L 67/535 |
| 2021/0398016 | A1* | 12/2021 | Tsimerman | G06F 18/254 |
| 2021/0405991 | A1* | 12/2021 | Parra | G06F 8/65 |
| 2022/0092553 | A1* | 3/2022 | Jon | G06Q 10/1095 |

* cited by examiner

METHOD AND APPARATUS FOR AUTOMATED INTER-ACCOUNT INTERACTIONS

CROSS-REFERENCE TO RELATED APPLICATION

The present application is a continuation of U.S. patent application Ser. No. 17/537,109 filed Nov. 29, 2021, which claims the priority benefit of U.S. provisional application No. 63/119,264 filed Nov. 30, 2020 and entitled "Method and Apparatus for Automated Inter-Account Interactions," the entire contents of the which is hereby incorporated herein by reference.

DESCRIPTION OF THE RELATED TECHNOLOGY

A random act of kindness is a non-premeditated action by a first person that is intended to help a second person, for instance a second person in the same community as the first person. As technology, remote working, and remote purchasing become increasingly pervasive, opportunities for random acts of kindness helping others in a person's community decrease. For instance, while a generous shopper at a brick-and-mortar grocery store might offer to help pay for another shopper's groceries upon seeing that shopper coming up short on money needed to buy their food, it is impossible to perform a similar act of kindness during traditional online shopping. Traditional online shopping, banking, and other online resources are generally designed to prioritize data privacy, and are therefore only designed to allow customers to interact with a merchant, a bank, or another entity. Traditional online shopping, banking, and other online resources does not generally allow interactions between one customer and another customer, and are therefore technical incapable of important functionalities.

SUMMARY

Disclosed are systems, apparatuses, methods, computer readable medium, and circuits for automated account interaction. The system for automated account interaction has access to information about asset accounts, and receives transaction indications indicating transactions (e.g., payments or other transfers of asset(s)) made by those asset accounts. The system automatically selects a first transaction indication for a first transaction made using a first asset account, for instance based on location, time, quantity of asset(s) transferred, randomized selection from a group, and/or a trained machine learning model. The system automatically selects a second asset account associated with a second user, for instance based on the second user's location, account balance, randomized selection from a group, and/or a trained machine learning model. The system automatically transfers a quantity of asset(s) from the second asset account to the first asset account, and communicates an indicator indicating transfer completion. The quantity of the asset(s) can be the quantity corresponding to the first transaction, or a portion thereof. The confirmation indicator can be sent to device(s) associated with either or both account(s) and/or can be published to a feed, graph, and/or index. The confirmation indicator can be sent to device(s) associated with either or both account(s), and/or can be published to a public or private feed, and/or can include a graphed donation index.

According to one example, a method for automated account interaction is provided. The method includes identifying, based on asset account information accessed by one or more transaction service servers, a plurality of asset accounts associated with a plurality of users; receiving a plurality of asset transaction indications indicative of a plurality of asset transactions, wherein each of the plurality of asset transaction indications indicates that at least one of the plurality of asset accounts has performed one of the plurality of asset transactions; automatically selecting a first asset transaction indication from the plurality of asset transaction indications based on a first output of one or more trained machine learning (ML) models in response to input of the plurality of asset transaction indications into the one or more trained ML models, the first asset transaction indication indicating that a first asset account of the plurality of asset accounts has performed a first asset transaction of the plurality of asset transactions, the first asset account associated with a first user of the plurality of users; automatically selecting a second asset account from the plurality of asset accounts based on a second output of the one or more trained ML models in response to input of information about the plurality of asset accounts into the one or more trained ML models, the second asset account associated with a second user of the plurality of users, the second asset account having at least a first quantity of an asset; automatically transferring the first quantity of the asset from the second asset account to the first asset account in response to automatically selecting the first asset transaction indication and automatically selecting the second asset account; and automatically communicating a confirmation indicator, the confirmation indicator indicating that the first quantity of the asset has been transferred from the second asset account to the first asset account.

In another example, a system for automated account interaction is provided. The system includes a storage (e.g., a memory configured to store data, such as virtual content data, one or more images, etc.) and one or more processors (e.g., implemented in circuitry) coupled to the memory and configured to execute instructions. Execution of the instructions by the one or more processors causes the one or more processors, in conjunction with various components (e.g., a network interface, a display, an output device, etc.), to: identify, based on asset account information accessed by one or more transaction service servers, a plurality of asset accounts associated with a plurality of users; receive a plurality of asset transaction indications indicative of a plurality of asset transactions, wherein each asset transaction indication of the plurality of asset transaction indications indicates that at least one of the plurality of asset accounts has performed one of the plurality of asset transaction; automatically select a first asset transaction indication from the plurality of asset transaction indications based on a first output of one or more trained machine learning (ML) models in response to input of the plurality of asset transaction indications into the one or more trained ML models, the first asset transaction indication indicating that a first asset account of the plurality of asset accounts has performed a first asset transaction of the plurality of asset transactions, the first asset account associated with a first user of the plurality of users; automatically select a second asset account from the plurality of asset accounts based on a second output of the one or more trained ML models in response to input of information about the plurality of asset accounts into the one or more trained ML models, the second asset account associated with a second user of the plurality of users, the second asset account having at least a first quantity of the asset; automatically transfer the first quantity of the asset from the second asset account to the first asset account in response to automatically selecting the first asset transaction indication and automatically selecting the second asset account; and automatically communicate a confirmation indicator, the confirmation indicator indicating that the first quantity of the asset has been transferred from the second asset account to the first asset account.

In another example, a non-transitory computer readable storage medium having embodied thereon a program is provided. The program is executable by a processor to perform a method of automated account interaction. The method includes identifying, based on asset account information accessed by one or more payment service servers, a plurality of asset accounts associated with a plurality of users; receiving a plurality of asset transaction indications indicative of a plurality of asset transactions, wherein each asset transaction indication of the plurality of asset transaction indications indicates that at least one of the plurality of asset accounts has performed one of the plurality of asset transactions; automatically selecting a first asset transaction indication from the plurality of asset transaction indications based on a first output of one or more trained machine learning (ML) models in response to input of the plurality of asset transaction indications into the one or more trained ML models, the first asset transaction indication indicating that a first asset account of the plurality of asset accounts has performed a first asset transaction of the plurality of asset transactions, the first asset account associated with a first user of the plurality of users; automatically selecting a second asset account from the plurality of asset accounts based on a second output of the one or more trained ML models in response to input of information about the plurality of asset accounts into the one or more trained ML models, the second asset account associated with a second user of the plurality of users, the second asset account having at least a first quantity of the asset; automatically transferring the first quantity of the asset from the second asset account to the first asset account in response to automatically selecting the first asset transaction indication and automatically selecting the second asset account; and automatically communicating an indicator, the confirmation indicator indicating that the first quantity of the asset has been transferred from the second asset account to the first asset account.

In another example, a system for automated account interaction is provided. The system includes means for identifying, based on asset account information accessed by one or more transaction service servers, a plurality of asset accounts associated with a plurality of users; means for receiving a plurality of asset transaction indications indicative of a plurality of asset transactions, wherein each of the plurality of asset transaction indications indicates that at least one of the plurality of asset accounts has performed one of the plurality of asset transactions; means for automatically selecting a first asset transaction indication from the plurality of asset transaction indications based on a first output of one or more trained machine learning (ML) models in response to input of the plurality of asset transaction indications into the one or more trained ML models, the first asset transaction indication indicating that a first asset account of the plurality of asset accounts has performed a first asset transaction of the plurality of asset transactions, the first asset account associated with a first user of the plurality of users; means for automatically selecting a second asset account from the plurality of asset accounts based on a second output of the one or more trained ML models in response to input of information about the plurality of asset accounts into the one or more trained ML models, the second asset account associated with a second user of the plurality of users, the second asset account having at least a first quantity of an asset; means for automatically transferring the first quantity of the asset from the second asset account to the first asset account in response to automatically selecting the first asset transaction indication and automatically selecting the second asset account; and means for automatically communicating a confirmation indicator, the confirmation indicator indicating that the first quantity of the asset has been transferred from the second asset account to the first asset account.

BRIEF DESCRIPTION OF THE DRAWINGS

Illustrative embodiments of the present application are described in detail below with reference to the following figures.

DETAILED DESCRIPTION

Figure 1:
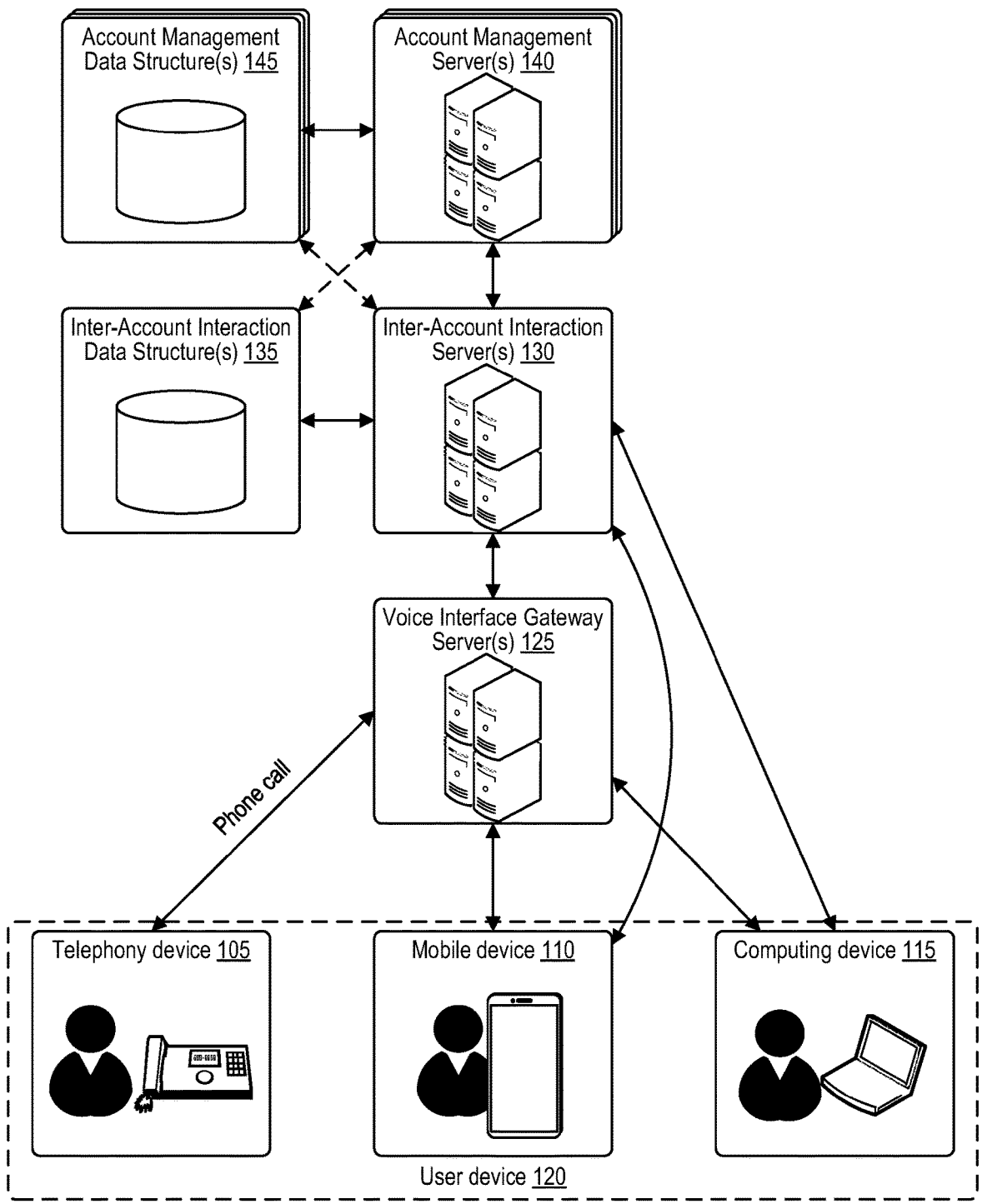
FIG. 1 block diagram illustrating a system architecture of a system for automated account interaction.

Technologies and techniques for automated account interaction are described. A system for automated account interaction has access to information about asset accounts, and receives transaction indications indicating transactions (e.g., payments or other transfers of asset(s)) made by those asset accounts. The system automatically selects a first transaction indication for a first transaction made using a first asset account, for instance based on location, time, quantity of asset(s) transferred, randomized selection from a group, and/or a trained machine learning model. The system automatically selects a second asset account associated with a second user, for instance based on the second user's location, account balance, randomized selection from a group, and/or a trained machine learning model. The system automatically transfers a quantity of asset(s) from the second asset account to the first asset account, and communicates an indicator indicating transfer completion. The quantity of the asset(s) can be the quantity corresponding to the first transaction, or a portion thereof. The confirmation indicator can be sent to device(s) associated with either or both account(s) and/or can be published to a feed, graph, and/or index. The confirmation indicator can be sent to device(s) associated with either or both account(s), and/or can be published to a public or private feed, and/or can include a graphed donation index.

Traditional online shopping, banking, donation, point of sale (POS), payment processing, transaction processing, and/or other online resources are generally designed to prioritize data privacy, and are therefore only designed to allow customers to interact with a merchant, a bank, or another entity. Traditional online shopping, banking, donation, point of sale (POS), payment processing, transaction processing, and/or other online resources generally do not allow interactions between one customer and another customer, and are therefore technical incapable of important functionalities. The technologies and techniques for automated account interaction described herein have a technical effect of expanding the functionalities of servers managing user payment accounts and user devices interacting with servers managing user payment accounts. For instance, the technologies and techniques for automated account interaction described herein allows for a system to automatically transfer funds from a first asset account of a first user to a second asset account of a second user to pay for a purchase that the second user recently made, or to pay for a portion (e.g., percentage) of a purchase that the second user recently made, as a random act of kindness. The system can improve speed and efficiency of transaction processing technologies by automating certain operations, such as asset transaction selection, asset account selection, transfer, and confirmation indication communication. In some examples, the system can improve speed and efficiency of transaction processing technologies by allowing transfers between user accounts without a party in the middle, such as an escrow entity. In some examples, escrow can be used to perform a transfer between the two asset accounts. The system can provide for intelligent and customized account and/or transaction selection using trained machine learning models and/or selection criteria. The system can continue to learn in real-time by continuing to train its trained machine learning models based on to selections (e.g., of transactions and/or accounts) made using the trained machine learning models and/or any feedback associated with these selections.

FIG. 1 is a block diagram illustrating a system architecture for automated account interaction. The system architecture includes various types of user devices 120. User devices 120 include telephony devices 105, such as landline telephones or cellular phones. User devices 120 include computing devices 115 such as desktop computers, laptop computers, servers, terminals, kiosks, or any other computing system 1000 discussed with respect to FIG. 10. User devices 120 include mobile devices 110, such as smartphones, cellular phones, mobile handsets, tablet devices, portable video game consoles, portable media players, head-mounted displays (HMDs), virtual reality (VR) devices, augmented reality (AR) devices, mixed reality (MR) devices, extended reality (XR) devices, smartwatches, smart glasses, smart rings, smart bracelets, other wearable devices, health monitor devices, health tracking devices, fitness tracking devices, another type of computing system 1000, or a combination thereof. In some examples, a user device 120 may be a combination of a telephony device 105, mobile device 110, and/or computing device 115.

The system architecture includes one or more voice interface gateway 125 servers, one or more inter-account interaction servers 130, one or more account management servers 140, one or more inter-account interaction data structures 135, and one or more account management data structures 145. In some cases, user device 120 may receive an input from a user of the user device 120. For example, the user device 120 may receive the input through an input interface, such as a physical keyboard or keypad with physical keys or buttons, a virtual keyboard or keypad with virtual keys or buttons on a touchscreen, another touchscreen interface, a microphone that records the user's voice, a touchpad, a mouse, any input device 1060 discussed with respect to FIG. 10, or some combination thereof.

If the input device used is a microphone of the user device 120, the microphone may record a voice recording of the user's voice. In some examples, the user device 120 sends the voice recording to the voice interface gateway servers 125. The voice interface gateway servers 125, upon receiving the voice recording, convert the voice recording into a string of text using a conversion algorithm, which may be referred to as parsing the voice recording, automatic speech recognition (ASR), computer speech recognition (CSR), speech to text (STT), or a combination thereof. The conversion algorithm may convert the voice recording into the string of text using, for example, hidden Markov models, dynamic time warping (DTW)-based speech recognition, deep neural networks, deep feedforward neural networks (DNNs), recurrent neural networks (RNNs), time delay neural networks (TDNNs), convolutional neural networks (CNNs), denoising autoencoders, or combinations thereof.

In some examples, the user device 120 converts the voice recording into the string of text using the conversion algorithm. In some examples, the voice recording is converted into the string of text by a combination of the user device 120 and the voice interface gateway servers 125, for example with the different devices performing various operations of the conversion algorithm. For example, if the user device 120 engages in a phone call or voice-over-IP call with an automated assistant running on the voice interface gateway servers 125 and/or on the inter-account interaction servers 130, the user's voice may be sent from the user device 120 to the voice interface gateway servers 125 over telephone, cellular network, or internet network lines, and can be recorded during the phone call and temporarily stored by the voice interface gateway servers 125 while the voice recording is converted into the string of text. In some examples, the voice recording can be a request or statement to a virtual personal assistant whose speech recognition functionality runs at least partially on the user device 120 and/or at least partially on the voice interface gateway servers 125. Once the voice recording is converted into a string of text by the user device 120 and/or the voice interface gateway servers 125, the string of text is sent to the inter-account interaction servers 130 from the user device 120 and/or the voice interface gateway servers 125. The inter-account interaction servers 130 may then parse the string of text to determine the intent of the received input.

The inter-account interaction servers 130 automatically perform interactions between different accounts associated with different users. The interactions can include, for example, an automatic donation. In an automatic donation, the inter-account interaction servers 130 identifies (e.g., based on information received from the account management servers 140 and/or account management data structures 145) that a first user has purchased a commodity (e.g., a good or service) as part of a first purchase using a first user payment account. The inter-account interaction servers 130 automatically select a second user payment account of a second user. The second user payment account can be a user payment account that has been designated by the second user to be a donation account. The inter-account interaction servers 130 can automatically trigger transfer of a quantity of funds from the second user payment account to the first user payment account, and can communicate an indicator indicating that the transfer has been performed.

In some examples, the quantity of funds transferred from the second user payment account to the first user payment account by the inter-account interaction servers 130 can be equal to a quantity of funds paid by the first user payment account during the first transaction. In such examples, the donation transferred from the second user payment account to the first user payment account essentially pays the first user back for the first purchase. In some examples, the quantity of funds transferred from the second user payment account to the first user payment account by the inter-account interaction servers 130 can be equal to a predetermine percentage of the quantity of funds paid by the first user payment account during the first transaction. For example, the percentage can be 1%, 5%, 10%, 15%, 20%, 25%, 30%, 35%, 40%, 45%, 50%, 55%, 60%, 65%, 70%, 75%, 80%, 85%, 90%, 95%, 99%, a percentage value less than 1%, a percentage value greater than 99%, or a percentage value in between any of the previously-listed percentage values.

In some examples, the inter-account interaction servers 130 can select the second user payment account randomly, semi-randomly, based on the second user payment account meeting certain criteria, or a combination thereof. In some examples, the criteria may be related to location, for instance based on a determination as to whether the location of the first user and the location of the second user both fall in a shared area or shared region (e.g., a shared radius of a predetermined distance, a shared address, a shared block, a shared network area, a shared network cell, a shared street, a shared city, a shared inter-city region, a shared county, a shared inter-county region, a shared state, a shared interstate region, a shared country, a shared inter-country region, a shared continent, a shared inter-continental region, or a combination thereof). The criteria may be related to whether an available balance of the second user payment account is greater than or equal to a predetermined minimum balance. The predetermined minimum balance can be, for example, at least the quantity of funds to be transferred from the second user payment account to the first user payment account by the inter-account interaction servers 130.

The inter-account interaction data structures 135 store information tracking the interactions between different user payment accounts facilitated by the inter-account interaction servers 130, such as the automatic donation transactions described above. The inter-account interaction servers 130 can access the information tracking the interactions stored in the inter-account interaction data structures 135 and generate descriptions of different interactions that the inter-account interaction servers 130 publishes in a live feed of donations. The live feed of donations may be a personalized live feed, for instance generated for the first user and served from the inter-account interaction servers 130 to a first user device 120 associated with the first user or generated for the second user and served from the inter-account interaction servers 130 to a second user device 120 associated with the second user. The live feed of donations may be a public live feed, which may be generated for all users (or all users meeting certain criteria, such as all users in a certain area) and served from the inter-account interaction servers 130 to all user devices 120 that request to access the live feed. The indication communicated by the inter-account interaction servers 130 may include the live feed. Examples of such live feeds are illustrated, for instance, in the personal transfer feed 425 of FIG. 4 and the public transfer feed 630 of FIG. 6.

The inter-account interaction data structures 135 can generate personalized messages with the descriptions of the interactions, and can send these personalized messages to the first user device 120 associated with the first user, the second user device 120 associated with the second user, or both. The indication communicated by the inter-account interaction servers 130 may include such a message. Examples of such messages are illustrated, for instance, in the confirmation indicator message 505 of FIG. 5A and the confirmation indicator message 555 of FIG. 5B.

The inter-account interaction servers 130 can access the information tracking the interactions stored in the inter-account interaction data structures 135 and generate an index, for example identifying a sum quantity of funds transferred in all donations transactions (and/or other types of transactions) within a particular period of time. The index can be graphed over multiple periods of time as a representation of how generous a community is being over time. The indication communicated by the inter-account interaction servers 130 may identify such an index and/or may includes such a graph. Examples of such an index are illustrated, for instance, in the donation index 610 and the donation index graph 620 of FIG. 6. An example of such a graph is illustrated, for instance, in the donation index graph 620 of FIG. 6.

The inter-account interaction servers 130 can receive an input from the user device 120, from the voice interface gateway servers 125, or both. The input may include, for example, a text string, a voice recording, a button press, an alphanumeric character, a touchscreen user interface touch interaction, a mouse click user interface interaction, another type of input, or a combination thereof. The text string may include, for example, the previously-discussed text string generated by the voice interface gateway servers 125 and/or the user device 120 as a conversion of a voice recording from the user device 120. Based on the input that the inter-account interaction servers 130 receives from the user device 120 and/or the voice interface gateway servers 125, the inter-account interaction servers 130 can determine settings for different user accounts and/or user devices 120 associated with different users for automatic interactions. For example, based on the input, the inter-account interaction servers 130 can identify how much a user would like to add a quantity of funds identified in the input to a donation account from another user payment account associated with the user. The inter-account interaction servers 130 can then automatically transfer some of the funds in the donation account to other accounts associated with other users.

The input may also identify criteria corresponding to when and how often the donation account associated with the user can be selected by the inter-account interaction servers 130 for transferring funds from the donation account. For example, based on the input, the inter-account interaction servers 130 can identify a minimum frequency and/or a maximum frequency at which the inter-account interaction servers 130 can transfer donations of funds from the user's donation account to other accounts associated with other users. For instance, the user's input can set a maximum or minimum of M transfers per day, a maximum or minimum of M transfers per week, a maximum or minimum of M transfers per month, a maximum or minimum of M transfers per year, a maximum or minimum of M transfers per decade, and the like, with M being a non-negative integer such as 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, or an integer greater than 30.

The account management servers 140 can be queried by the inter-account interaction servers 130 for information about a specific account, a user associated with the account, and/or a user device 120 associated with the user and/or the account, or a combination thereof. The account management servers 140 can retrieve such information from the account management data structures 145 and provide such information to the inter-account interaction servers 130. The inter-account interaction servers 130 can also work with the account management servers 140 and/or the account management data structures 145 to initiate, trigger, perform, and/or facilitate the transfer of funds from one account to another. In some examples, the inter-account interaction servers 130 can request, based on a transfer, that an available balance in a first user payment account (e.g., a donation account) decrease by a particular quantity of funds, and that an available balance in a second user payment account (e.g., that receives the donation from the donation account) increase by the particular quantity of funds. In some examples, the inter-account interaction servers 130 can request, based on a transfer, that an available balance in a first user payment account (e.g., a donation account) decrease by a first quantity of funds, that an available balance in a second user payment account (e.g., that receives the donation from the donation account) increase by a second quantity of funds, and that that an available balance in a third payment account (e.g., that a transaction fee for facilitating the transfer) increase by a third quantity of funds.

In some cases, certain users and/or user payment accounts can be associated with banks, credit card institutions, debit card institutions, financial institutions, or other companies or organizations. For example, a financial institution or company can have a donation account. In some cases, a financial institution can have an account that may receive a fee whenever the inter-account interaction servers 130 performs a predetermined type of transaction or transfer. In some examples, a financial institution may have a cashback account from which the inter-account interaction servers 130 transfer a quantity of funds to a user payment account to perform a cashback transfer, such as the cashback transfer illustrated in FIG. 5B. In some examples, a financial institution may manage an emergency fund account from which the inter-account interaction servers 130 transfer a quantity of funds to a user payment account to perform an emergency fund transfer, such as the emergency fund transfer illustrated in FIG. 7.

While the voice interface gateway servers 125, the inter-account interaction servers 130, and the account management servers 140 are referred to herein as servers, it should be understood that these may be laptop computers, desktop computers, mobile devices, any other type of computing system 1000 discussed herein, or a combination thereof. The inter-account interaction data structures 135 and account management data structures 145 may be any type of data structures, such as databases, tables, spreadsheets, key-value stores, dictionaries, relational models, arrays, lists, array-lists, trees, other types of data structures discussed herein, or some combination thereof. In some cases, the inter-account interaction data structures 135 may be referred to as valid request databases, or with the phrase "valid request" followed by any of the other types of data structures. Similarly, the account management data structures 145 may be referred to as account management databases, or with the phrase "account management" followed by any of the other types of data structures.

Figure 2A:
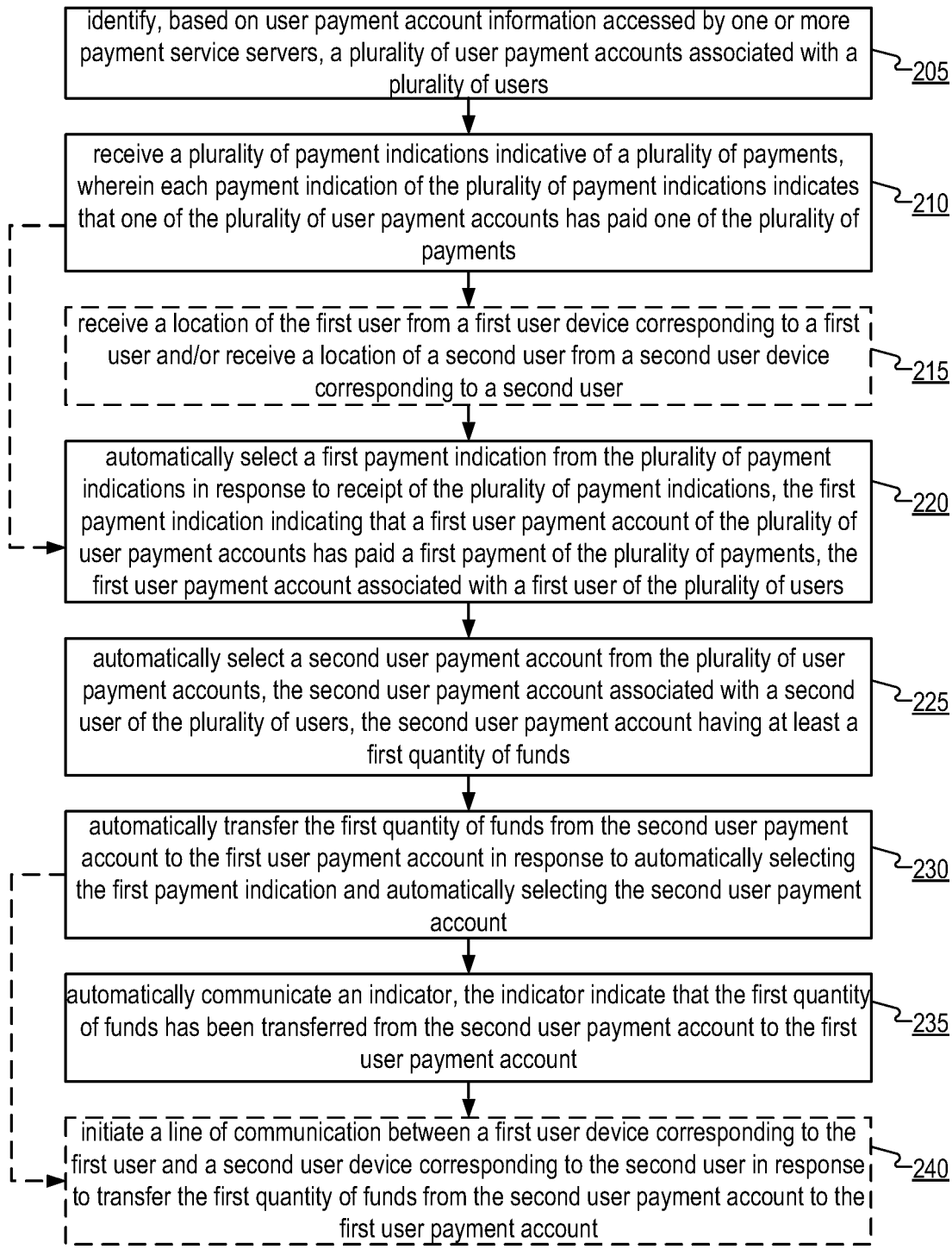
FIG. 2A is a flow diagram illustrating a process for automated account interaction.

FIG. 2A is a flow diagram illustrating a process 200 for automated account interaction. The process 200 for automated account interaction of FIG. 2A may be performed by an automated account interaction system. According to some examples, the automated account interaction system may include the one or more inter-account interaction servers 130, one or more voice interface gateway 125 servers, one or more account management servers 140, one or more inter-account interaction data structures 135, and one or more account management data structures 145, one or more computing systems 1000, any component or element of any of the previously-listed devices, any other type of device or device component mentioned herein, or some combination thereof.

At operation 205, the automated account interaction system identifies, based on user payment account information accessed by one or more payment service servers, a plurality of user payment accounts associated with a plurality of users.

At operation 210, the automated account interaction system receives a plurality of payment indications indicative of a plurality of payments. Each payment indication of the plurality of payment indications indicates that one of the plurality of user payment accounts has paid one of the plurality of payments. In some examples, operation 210 is followed by operation 215. In some examples, operation 210 is followed by operation 220.

At operation 215, the automated account interaction system receives a location of the first user from a first user device 120 corresponding to the first user, receives a location of a second user from a second user device 120 corresponding to a second user, or both. For example, the first user device 120 can identify the location of the first user by identifying the location of the first user device 120 based on one or more signals received by a positioning receiver of the first user device 120. Similarly, the second user device 120 can identify the location of the second user by identifying the location of the second user device 120 based on one or more signals received by a positioning receiver of the second user device 120.

In some examples, the first user device 120 can identify the location of the first user based on an input by the first user into the first user device 120. For instance, the first user device 120 cam receive a text string representing the location of the first user from a user input of the first user in response to the first user device 120 asking the first user to input the first user's hometown or current location. Similarly, the second user device 120 cam receive a text string representing the location of the second user from a user input of the second user in response to the second user device 120 asking the second user to input the second user's hometown or current location.

In some examples, the automated account interaction system identifies that the location of the first user and the location of the second user are within a shared region or shared area. For example, the shared region within which the location of the first user and the location of the second user are found can be shared radius of a predetermined distance, a shared address, a shared block, a shared network area, a shared network cell, a shared street, a shared city, a shared inter-city region, a shared county, a shared inter-county region, a shared state, a shared interstate region, a shared country, a shared inter-country region, a shared continent, a shared inter-continental region, or a combination thereof.

At operation 220, the automated account interaction system automatically selects a first payment indication from the plurality of payment indications in response to receipt of the plurality of payment indications. The first payment indication indicates that a first user payment account of the plurality of user payment accounts has paid a first payment of the plurality of payments. The first user payment account is associated with a first user of the plurality of users. In some examples, automatically selecting the first payment indication from the plurality of payment indications is based on a random selection from among the plurality of payment indications. In some examples, automatically selecting the first payment indication from the plurality of payment indications is based on a semi-random selection from among the plurality of payment indications, where certain payment indications have higher weights (and are therefore more likely to be randomly selected) than others. The weights may be based on whether or not certain payment indications meet certain criteria. In some examples, automatically selecting the first payment indication from the plurality of payment indications is based on a random or semi-random selection from a subset of the plurality of payment indications that fulfill certain criteria.

In some examples, the first payment includes a second quantity of funds. Thus, the first user payment account paying the first payment includes the first user payment account paying the second quantity of funds. In some examples, automatically selecting the first payment indication from the plurality of payment indications is based on the first payment indication indicating that the second quantity of funds is less than or equal to a maximum eligibility threshold. In some examples, the maximum eligibility threshold is the first quantity of funds discussed with respect to operation 225 and operation 230. In some examples, automatically selecting the first payment indication from the plurality of payment indications is based on the first payment indication indicating that the second quantity of funds is greater than or equal to a minimum eligibility threshold. The first payment indication can identify the second quantity of funds. In at least these ways, the criteria may be based on the value of the second quantity of funds.

In some examples, the first payment pays for a commodity of a particular category. The commodity is at least one of a good and a service. In some examples, automatically selecting the first payment indication from the plurality of payment indications is based on the particular category of the commodity. The first payment indication can identify the commodity and/or the category of the commodity. For example, the first payment indication can be selected because the category of the commodity is groceries, fuel, restaurant, office supplies, healthcare, medical, dental, vision, utilities, clothing, devices, housing, insurance, household items, supplies, hygiene, fitness, personal care, family care, education, financial services, entertainment, or another category. In at least these ways, the criteria may be based on the particular category of the commodity.

In some examples, the first user payment account pays the first payment within a particular time period. In some examples, automatically selecting the first payment indication from the plurality of payment indications is based on the particular time period. The first payment indication can identify a timestamp of the first payment, which may include a time, a date, and/or another indication of the time period. The time period may be determined based on which of a number of predetermined time periods the time and date of the timestamp fall into. For instance, the first payment indication can be selected because the first payment occurred at 10:06 AM on Tuesday, Nov. 24, 2020, which falls within a predetermined time period lasting between 9:00 AM and 11:00 AM on Tuesday, Nov. 24, 2020. The first payment indication can be selected because the first payment occurred during Labor Day or another holiday. The first payment indication can be selected because the first payment occurred after sunset or before sunrise. In at least these ways, the criteria may be based on the particular category of the commodity.

In some examples, automatically selecting the first payment indication from the plurality of payment indications is based on a second quantity of funds having been previously transferred from an account associated with the first user (e.g., either the first user payment account or another user payment account associated with the first user) to a third user payment account of the plurality of user payment accounts associated with a third user of the plurality of users. For example, if the automated account interaction system determines that the first user has previously donated extensively to other users (such as the third user) but has not received any donation transfers for at least a predetermined duration of time, the selection of the first payment indication can be based on this determination. This can prevent users from feeling that they are giving up too much. Information regarding previous transfers can be kept track of, for example in the inter-account interaction data structures 135. In at least these ways, automatically selecting the first payment indication from the plurality of payment indications can be based on past donations, transactions, and/or transfers. In at least these ways, the criteria may be based on past donations, transactions, and/or transfers involving the first user payment account.

The first user payment account can be a first type of account. In some examples, and automatically selecting the first payment indication from the plurality of payment indications is based on the first type of account being a particular type of account. For example, automatically selecting the first payment indication from the plurality of payment indications can be based on the first user payment account being a type of account other than a donation account, wherein a donation account is another type of account. In at least these ways, the criteria may be based on a type of account of the first user payment account.

In some examples, automatically selecting the first payment indication from the plurality of payment indications is based on data processed using at least one of one or more artificial intelligence algorithms, one or more machine learning models generated using one or more machine learning algorithms and trained using one or more sets of training data, and one or more neural networks. In some examples, the automated account interaction system selects the first payment indication from the plurality of payment indications in response to receipt of the plurality of payment indications dynamically and/or in real-time.

The selection of the first payment indication at operation 220 can be referred to as the selection of the first user payment account, as the selection of the first user, as the selection of the first payment, or a combination thereof.

At operation 225, the automated account interaction system automatically selects a second user payment account from the plurality of user payment accounts. The second user payment account is associated with a second user of the plurality of users. In some examples, the second user payment account includes at least a first quantity of funds. In some examples, automatically selecting the second user payment account from the plurality of user payment accounts is based on a random selection from among the plurality of user payment accounts. In some examples, automatically selecting the second user payment account from the plurality of user payment accounts is based on a semi-random selection from among the plurality of user payment accounts, where certain user payment accounts have higher weights (and are therefore more likely to be randomly selected) than others. The weights may be based on whether or not certain user payment accounts meet certain criteria. In some examples, automatically selecting the second user payment account from the plurality of user payment accounts is based on a random or semi-random selection from a subset of the plurality of payment indications that fulfill certain criteria.

In some examples, automatically selecting the first payment indication from the plurality of payment indications is based on an available balance of the second user payment account being greater than or equal to a minimum eligibility threshold. In some examples, the minimum eligibility threshold is the first quantity of funds. In some examples, the minimum eligibility threshold is the second quantity of funds (that were paid in the first payment mentioned in operation 220). In some examples, automatically selecting the first payment indication from the plurality of payment indications is based on an available balance of the second user payment account being less than or equal to a maximum eligibility threshold. The first payment indication can identify the second quantity of funds. In at least these ways, the criteria may be based on the available balance of the second user payment account.

In some examples, automatically selecting the second user payment account from the plurality of user payment accounts is based on identifying that an account associated with the second user (e.g., either the second user payment account or another user payment account associated with the second user) has paid a second payment of the plurality of payments. The second payment may be a purchase of a commodity. The second payment may be an automatic donation transfer to a third user payment account associated with a third user. In at least these ways, the criteria may be based on past donations, transactions, and/or transfers involving the first user payment account.

In some examples, automatically selecting the first payment indication from the plurality of payment indications is based on a location of the first user and the location of the second user (e.g., as determined at operation 215) being within a shared region. In at least these ways, automatically selecting the first payment indication from the plurality of payment indications can be based on the location of the first user and/or the location of the second user. In some examples, automatically selecting the second user payment account from the plurality of user payment accounts is based on the location of the first user and the location of the second user (e.g., as determined at operation 215) being within a shared region. In at least these ways, automatically selecting the second user payment account from the plurality of user payment accounts can be based on the location of the first user and/or the location of the second user. In at least these ways, the criteria may be based on the location of the first user and/or the location of the second user.

The second user payment account can be a second type of account. In some examples, and automatically selecting the second user payment account from the plurality of user payment accounts is based on the second type of account being a particular type of account. For example, automatically selecting the second user payment account from the plurality of user payment accounts can be based on the second user payment account being a donation account, wherein a donation account is a type of account. In at least these ways, the criteria may be based on a type of account of the second user payment account.

In some examples, automatically selecting the second user payment account from the plurality of user payment accounts is based on data processed using at least one of one or more artificial intelligence algorithms, one or more machine learning models generated using one or more machine learning algorithms and trained using one or more sets of training data, and one or more neural networks. In some examples, the automated account interaction system selects the second user payment account from the plurality of user payment accounts dynamically and/or in real-time.

The selection of the second user payment account at operation 225 can be referred to as the selection of the second user.

At operation 230, the automated account interaction system automatically transfers the first quantity of funds from the second user payment account to the first user payment account in response to automatically selecting a first payment indication and in response to automatically selecting the second user payment account. The automated account interaction system can, in some cases, initiate the transfer of the first quantity of funds from the second user payment account to the first user payment account. The automated account interaction system can, in some cases, send an instruction to another device that, based on the instruction, transfers first quantity of funds from the second user payment account to the first user payment account. The automated account interaction system can, in some cases, facilitate the transfer of the first quantity of funds from the second user payment account to the first user payment account.

In some examples, the second user payment account corresponds to a financial institution and/or company. For example, the second user payment account can be a donation account of a financial institution and/or company. In some examples, the second user payment account can be a cashback account of a financial institution and/or company, from which the automated account interaction system transfers the first quantity of funds to the first user payment account to perform a cashback transfer, such as the cashback transfer illustrated in FIG. 5B. In some examples, the second user payment account can be an emergency fund account of a financial institution and/or company, from which the automated account interaction system transfers the first quantity of funds to the first user payment account to perform an emergency fund transfer, such as the emergency fund transfer illustrated in FIG. 7.

Because the first quantity of funds is transferred from the second user payment account to the first user payment account, the second user payment account may be referred to as the transferor user payment account, while the first user payment account may be referred to as the transferee user payment account.

In some examples, the automated account interaction system automatically sends a request to the second user device associated with the second user and the second user payment account after selecting the second user payment account in operation 220 and before automatically transferring the first quantity of funds from the second user payment account to the first user payment account. The request can, for instance, be a request for the user to approve of the transfer. For example, the second user device can, upon receiving the request, display or otherwise provide a user interface for the second user, and can receive either a confirmation or a refusal from the second user. The second user device can send a response to the automated account interaction system conveying the confirmation or refusal. The automated account interaction system can automatically transfer the first quantity of funds from the second user payment account to the first user payment account upon receiving the confirmation from the second user device.

At operation 235, the automated account interaction system automatically communicates an indicator. The confirmation indicator indicates that the first quantity of funds has been transferred from the second user payment account to the first user payment account.

In some examples, the confirmation indicator can include a message, and the automated account interaction system can generate the message. The message can identify the first user, the second user, or both. The message identifying the first user can include referring to the first user using a name, username, email address, hometown, zip code, or other recognizable identifier associated with the first user. The message identifying the second user can include referring to the second user using a name, username, email address, hometown, zip code, or other recognizable identifier associated with the second user.

The message identifying the first user can include referring to the first user using an anonymized identifier (e.g., identifying that the first quantity of funds has been transferred from the second user payment account to the first user payment account associated with an anonymous user). The message identifying the second user can include referring to the second user using an anonymized identifier (e.g., identifying that the first quantity of funds has been transferred to the first user payment account from the second user payment account associated with an anonymous user). The anonymized identifier for the first user can be different from the anonymized identifier for the second user (e.g., "ANON_USER_1" and "ANON_USER_2").

In some examples, the communicating the confirmation indicator includes sending the confirmation indicator to the first user device 120 corresponding to the first user, to the second user device 120 corresponding to the second user, or both. For instance, if the confirmation indicator includes the message discussed above, communicating the confirmation indicator can include sending the message to the first user device 120 corresponding to the first user, to the second user device 120 corresponding to the second user, or both.

In some examples, communicating the confirmation indicator includes publishing the confirmation indicator on a feed that is viewable by at least a subset of a plurality of user devices corresponding to the plurality of users. Publishing the confirmation indicator on the feed can include modifying a markup file corresponding to the feed to add the confirmation indicator. In some examples, the automated account interaction system serves the markup file to a viewer device of the plurality of user devices, and the feed is viewable by the viewer device upon transfer of the markup file to the viewer device. The viewer device may be the first user device 120 associated with the first user. The viewer device may be the second user device 120 associated with the second user. The feed may be a live feed, a periodically updated feed, a static feed, or a combination thereof. The feed may be a personalized feed, for instance generated for a viewer user associated with the viewer device and served from the automated account interaction system to the viewer device. The feed of donations may be a public feed, which may be generated for all viewer users (or all viewer users meeting certain criteria, such as all viewer users in a certain area or region) and served from the automated account interaction systems to all viewer devices that request to access the feed. The indication communicated by the automated account interaction system may include the feed. Examples of such feeds are illustrated, for instance, in the personal transfer feed 425 of FIG. 4 and the public transfer feed 630 of FIG. 6.

In some examples, the method ends after operation 235. In some examples, operation 235 is followed by operation 240.

At operation 240, the automated account interaction system initiates a line of communication between a first user device 120 corresponding to the first user and a second user device 120 corresponding to the second user in response to transferring the first quantity of funds from the second user payment account to the first user payment account.

The line of communication can include transfer of audio recorded at one of the first user device 120 and the second user device 120 to another of the first user device 120 and the second user device 120. For example, the line of communication can include a telephone call, a VoIP call, and/or an asynchronous transfer of voice recordings and/or other audio recordings.

The line of communication can include transfer of video recorded at one of the first user device 120 and the second user device 120 to another of the first user device 120 and the second user device 120. For example, the line of communication can include a video call and/or an asynchronous transfer of video recordings and/or other video clips.

The line of communication can include transfer of one or more messages between the first user device 120 and the second user device 120. The one or more messages can including at least one of a string of text, an alphanumeric character, an image, a video, an audio clip, a motion graphic, an animation, an animated image, an icon, an emoji, and an emoticon. The one or more messages can be pre-prepared or predetermined, as in the predetermined responses 510 of FIG. 5A. The pre-prepared or predetermined messages can be prepared before automatically selecting a first payment indication and/or before automatically selecting the second user payment account. Limiting the line of communication to predetermined messages can improve privacy and reduce transfer of unwanted messages, such as spam, unwanted advances, or rude language through the line of communication. The one or more messages can be customized, as in the customized response 515 (e.g., typed as in the typing box 520 or audio recorded as in the audio recording recorded using the microphone button 522) of FIG. 5A. The customized messages can be prepared after automatically selecting a first payment indication and/or after automatically selecting the second user payment account.

In some examples, an intelligent selection engine may select the first payment indication from the plurality of payment indications in operation 220. In some examples, the intelligent selection engine may select the second user payment account from the plurality of user payment accounts in operation 225. The intelligent selection engine may use one or more artificial intelligence algorithms, one or more machine learning models generated using one or more machine learning algorithms and trained using one or more sets of training data, one or more neural networks, or a combination thereof. Examples of neural networks that can be used as part of the intelligent selection engine can include a convolutional neural network (CNN), time delay neural network (TDNN), a deep belief net (DBN), a Recurrent Neural Network (RNN), another type of neural network, or a combination thereof. The automated account interaction system can input data into the intelligent selection engine and receive processed data from the intelligent selection engine. The intelligent selection engine may be run at least in part on the automated account interaction system, may be run at least in part on a separate device (e.g., a remote server), or a combination thereof. Where the intelligent selection engine is run at least at least in part on the separate device, the automated account interaction system can send input data to the separate device, and can receive the processed data from the separate device. The input data can include, for example, a data structure identifying the plurality of payment indications (e.g., and associated information), a data structure identifying the plurality of user payment accounts (e.g., and associated information), or both. The processed data can include, for example, an indicator identifying the first payment indication, an indicator identifying the second user payment account, or a combination thereof. In some examples, selections made by the intelligent selection engine can be used as additional training data for one or more machine learning models based on one or more machine learning algorithms, so that the one or more machine learning models continue to evolve over time with further selections. In some examples, selections made by the intelligent selection engine can be used as additional training data for one or more machine learning models upon approval of either or both of the selections by one or more entities, such as the first user associated with the first user account, the second user associated with the second user account, an administrator associated with the automated account interaction system and/or the intelligent selection engine, or a combination thereof. The intelligent selection engine can be part of the inter-account interaction server(s) 130, the account management server(s) 140, the voice interface gateway server(s), another server, the first user device, the second user device, or a combination thereof. The intelligent selection engine can perform these selection operations in real-time, in a dynamic fashion, and/or periodically.

In some examples, an intelligent recommendation engine can provide recommendations to the first user device and/or to the second user device. For example, the intelligent recommendation engine can provide recommendations as to transfers, purchases, transactions, changes to settings, selection during operations 220 and/or 225, and any other operation discussed herein. The intelligent recommendation engine may use one or more artificial intelligence algorithms, one or more machine learning models generated using one or more machine learning algorithms and trained using one or more sets of training data, one or more neural networks, or a combination thereof. Examples of neural networks that can be used as part of the intelligent recommendation engine can include a convolutional neural network (CNN), time delay neural network (TDNN), a deep belief net (DBN), a Recurrent Neural Network (RNN), another type of neural network, or a combination thereof. In some examples, recommendations made by the intelligent recommendation engine can be used as additional training data for one or more machine learning models based on one or more machine learning algorithms, so that the one or more machine learning models continue to evolve over time with further recommendations. In some examples, recommendations made by the intelligent recommendation engine can be used as additional training data for one or more machine learning models upon approval of the recommendations by one or more entities, such as the first user associated with the first user account, the second user associated with the second user account, an administrator associated with the automated account interaction system and/or the intelligent recommendation engine, or a combination thereof. The intelligent recommendation engine can be part of the inter-account interaction server(s) 130, the account management server(s) 140, the voice interface gateway server(s), another server, the first user device, the second user device, or a combination thereof. The intelligent recommendation engine can perform these recommendation operations in real-time, in a dynamic fashion, and/or periodically.

In some examples, an intelligent customization engine can customize user interfaces and/or experiences at the first user device and/or at the second user device. For example, the intelligent customization engine can provide customization as to user interfaces, transfers, purchases, transactions, changes to settings, selection during operations 220 and/or 225, and any other operation discussed herein. The intelligent customization engine may use one or more artificial intelligence algorithms, one or more machine learning models generated using one or more machine learning algorithms and trained using one or more sets of training data, one or more neural networks, or a combination thereof. Examples of neural networks that can be used as part of the intelligent customization engine can include a convolutional neural network (CNN), time delay neural network (TDNN), a deep belief net (DBN), a Recurrent Neural Network (RNN), another type of neural network, or a combination thereof. In some examples, customizations made by the intelligent customization engine can be used as additional training data for one or more machine learning models based on one or more machine learning algorithms, so that the one or more machine learning models continue to evolve over time with further customizations. In some examples, customizations made by the intelligent customization engine can be used as additional training data for one or more machine learning models upon approval of the customizations by one or more entities, such as the first user associated with the first user account, the second user associated with the second user account, an administrator associated with the automated account interaction system and/or the intelligent customization engine, or a combination thereof. The intelligent customization engine can be part of the inter-account interaction server(s) 130, the account management server(s) 140, the voice interface gateway server(s), another server, the first user device, the second user device, or a combination thereof. The intelligent customization engine can perform these customization operations in real-time, in a dynamic fashion, and/or periodically.

In some examples, the process 200 for automated account interaction repeats (e.g., starts back again from operation 205) after the process 200 for automated account interaction ends at and/or following operation(s) 230, 235, and/or 240.

Figure 2B:
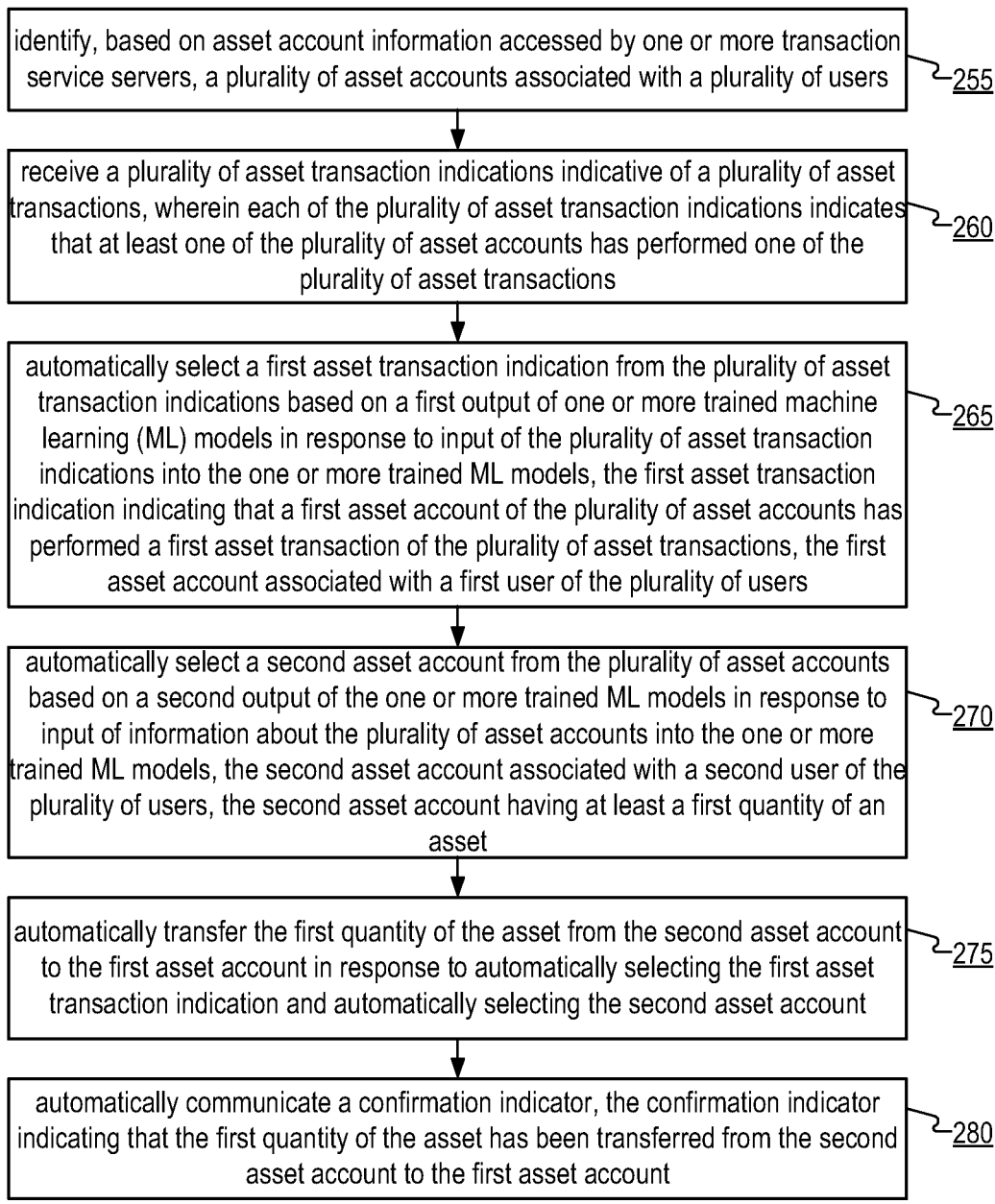
FIG. 2B is a flow diagram illustrating a process for automated account interaction.

FIG. 2B is a flow diagram illustrating a process 250 for automated account interaction. The process 250 for automated account interaction of FIG. 2B may be performed by an automated account interaction system. According to some examples, the automated account interaction system may include the one or more inter-account interaction servers 130, one or more voice interface gateway 125 servers, one or more account management servers 140, one or more inter-account interaction data structures 135, and one or more account management data structures 145, one or more computing systems 1000, any component or element of any of the previously-listed devices, any other type of device or device component mentioned herein, or some combination thereof.

At operation 255, the automated account interaction system identifies, based on asset account information accessed by one or more transaction service servers, a plurality of asset accounts associated with a plurality of users. In some examples, operation 255 corresponds to, and/or includes, operation 205 of the process 200.

Figure 3A:
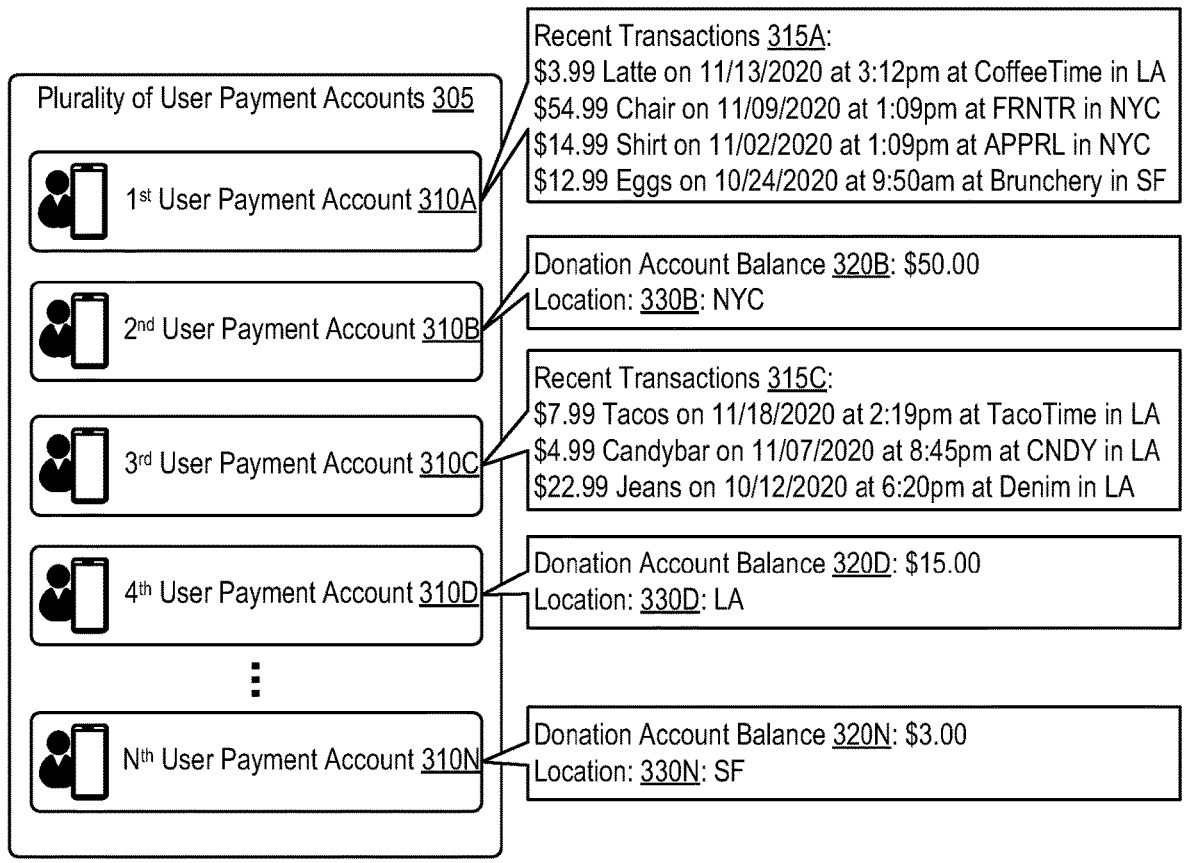
FIG. 3A is a conceptual diagram illustrating a plurality of user payment accounts.
Figure 3B:
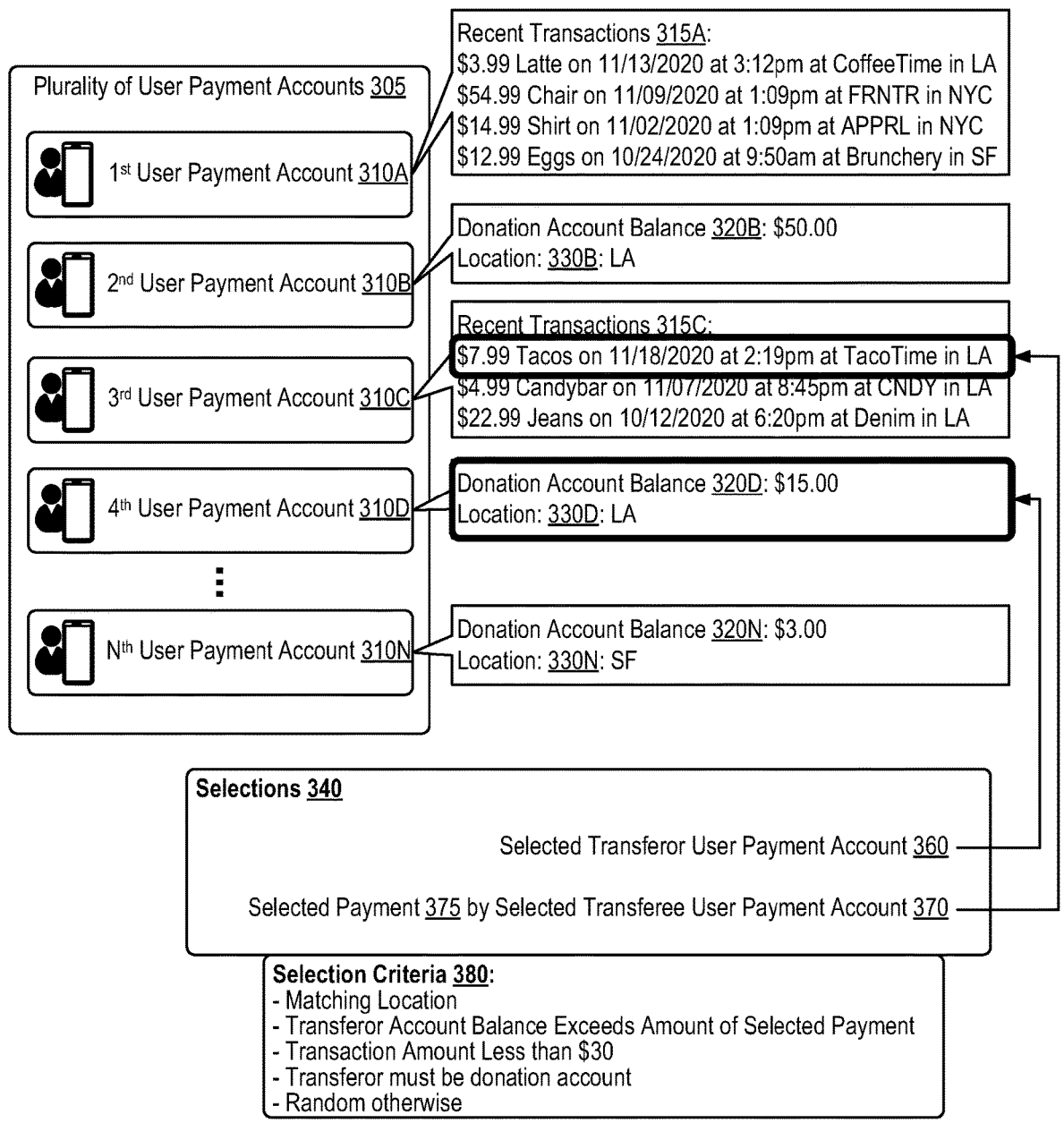
FIG. 3B is a conceptual diagram illustrating automatic selection of a transferor and a transferee for a transfer from the plurality of user payment accounts of FIG. 3A.
Figure 4:
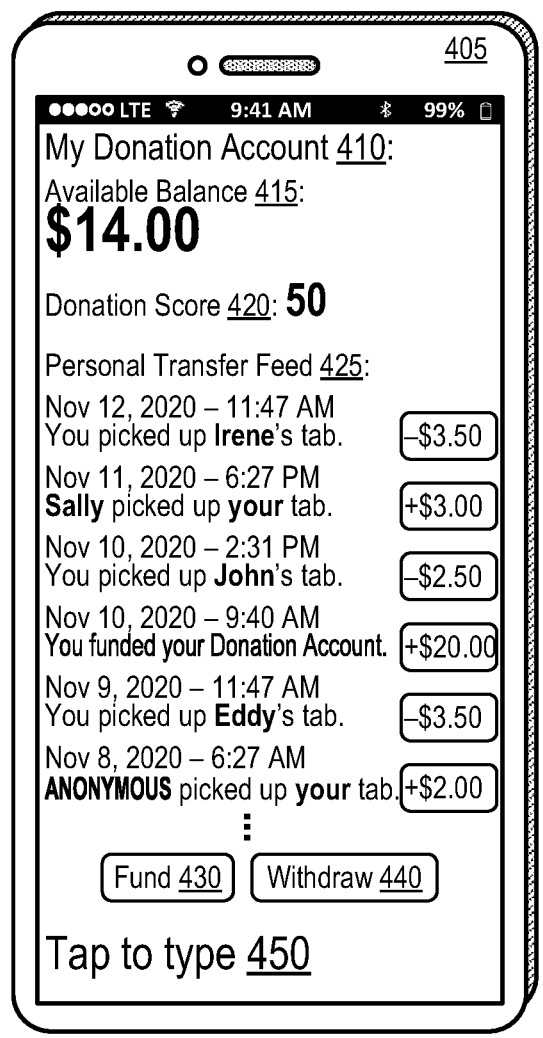
FIG. 4 is a conceptual diagram illustrating a donation account overview graphical user interface (GUI) with information about a user's donation account.
Figure 5A:
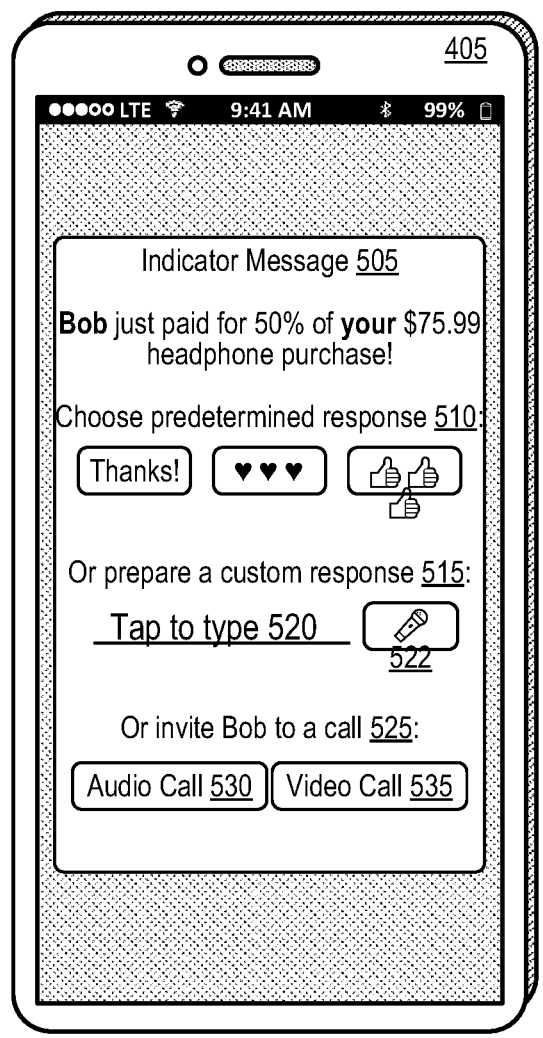
FIG. 5A is a conceptual diagram illustrating an indicator message graphical user interface (GUI) with an indicator message identifying receipt of a donation from another account.
Figure 5B:
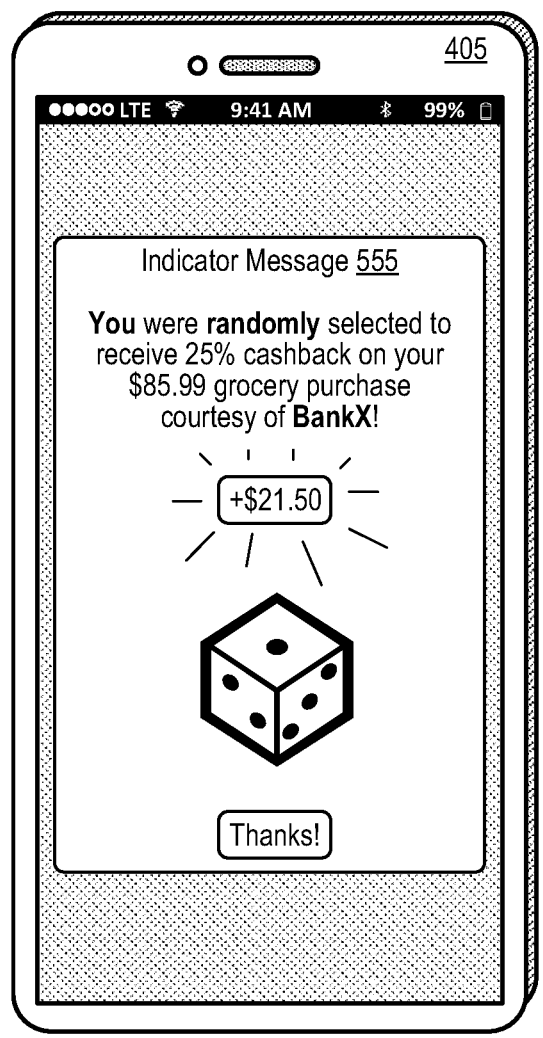
FIG. 5B is a conceptual diagram illustrating an indicator message graphical user interface (GUI) with an indicator message identifying receipt of a cashback reward.
Figure 6:
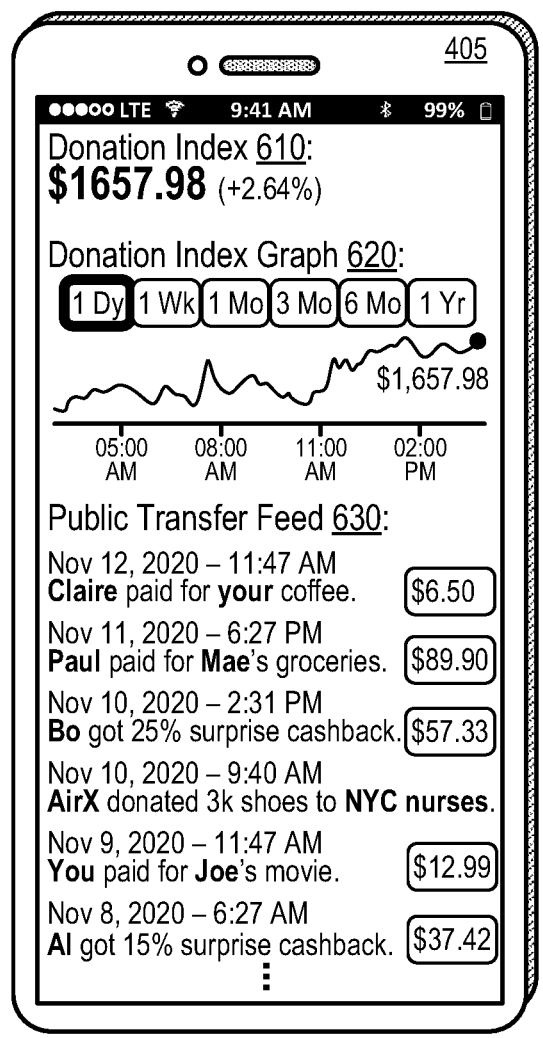
FIG. 6 is a conceptual diagram illustrating a donation index graphical user interface (GUI) with a donation index, donation index graph, and donation feed.
Figure 7:
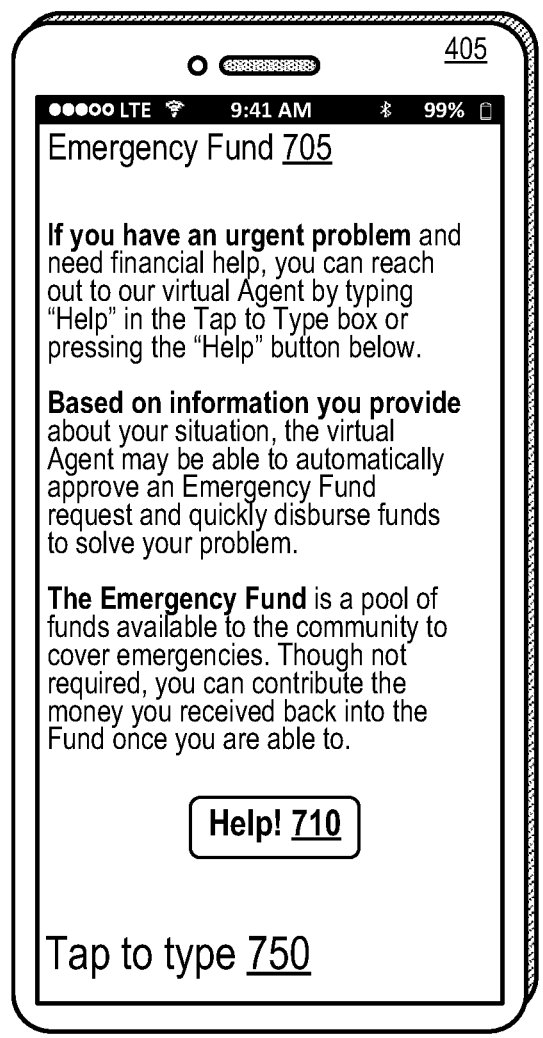
FIG. 7 is a conceptual diagram illustrating an emergency fund graphical user interface (GUI).
Figure 8:
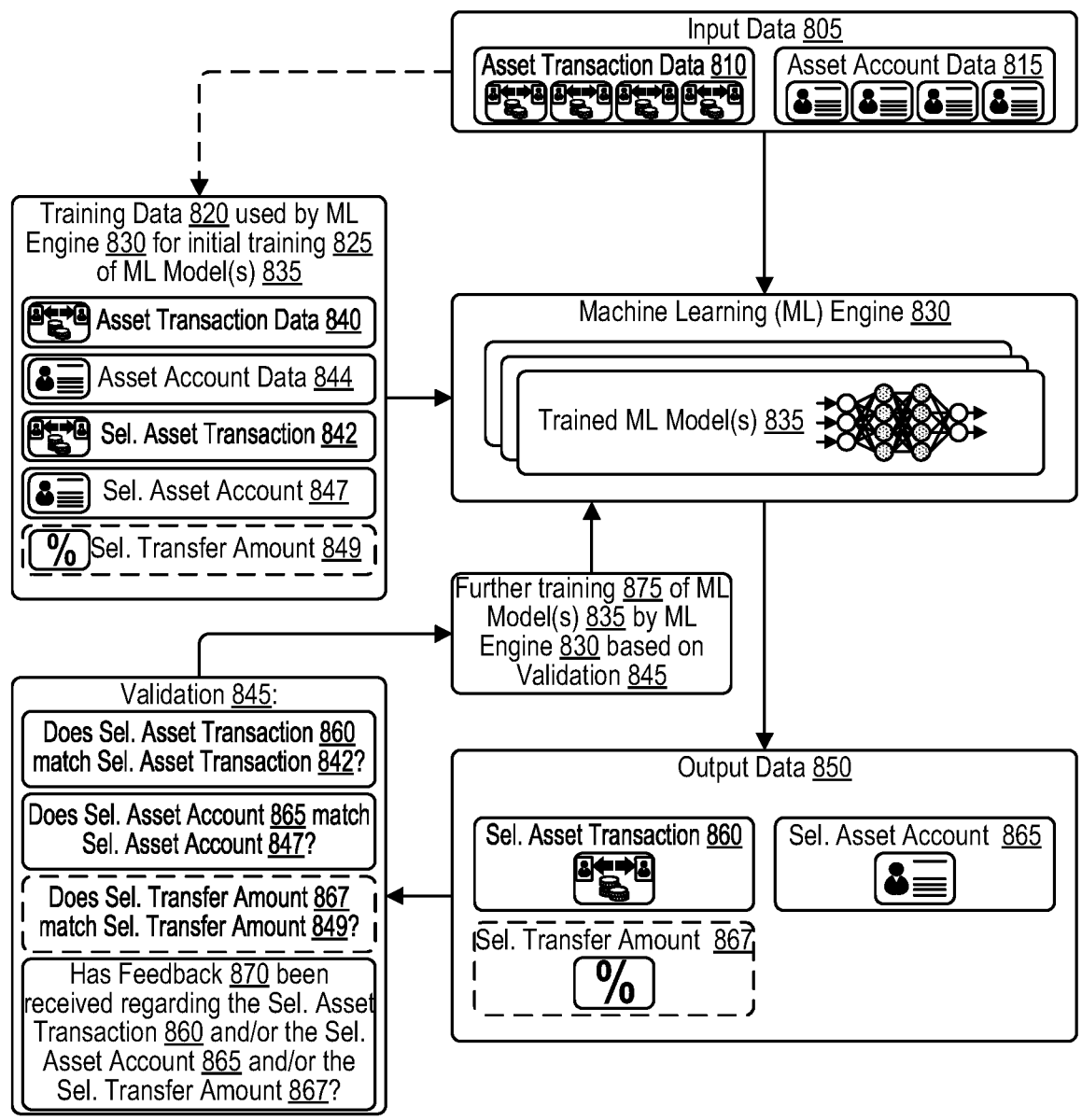
FIG. 8 is a block diagram illustrating a process for automated payment selection, automated account selection, and/or automated account interaction using a machine learning (ML) engine.

Examples of the plurality of asset accounts include account(s) of a user of the user device 120, account(s) about which data is stored in the inter-account data structure(s) 135, account(s) about which data is stored in the account management data structure(s) 145, account(s) managed by the account management server(s) 140, account(s) involved in interactions managed by the inter-account interaction server(s) 130, at least one of the plurality of user payment accounts of the process 200, the first user payment account of the process 200, the second user payment account of the process 200, the first asset account of the process 250, the second asset account of the process 250, at least one of the plurality of user payment accounts 305 of FIGS. 3A-3B, at least one of the user payment accounts 310A-310N of FIGS. 3A-3B, the selected transferor user payment account 360 of FIG. 3B, the selected transferee user payment account 370 of FIG. 3B, the donation account 410 of FIG. 4, at least one of the accounts of the other users mentioned in FIG. 4 (e.g., Irene, Sally, John, Eddy, Anonymous), the user's account in FIG. 5A, the account of user Bob in FIG. 5A, the user's account in FIG. 5B, the account of BankX in FIG. 5B, the user's account of FIG. 6, at least one of the accounts of the other users mentioned in FIG. 6 (e.g., Claire, Paul, Mae, Bo, AirX, NYC Nurses, Joe, Al), the user's account in FIG. 7, the account(s) about which data is included in the asset account data 815 of FIG. 8, the account(s) about which data is included in the asset account data 844 of FIG. 8, the selected asset account 865 of FIG. 8, the selected asset account 847 of FIG. 8, or a combination thereof.

Examples of the one or more transaction service servers include the account management server(s) 140, the inter-account interaction server(s) 130, the voice interface gateway server(s) 125, or a combination thereof. Examples of the plurality of users include user(s) of the user device(s) 120, user(s) associated with account(s) associated the systems of FIG. 1 (e.g., the inter-account data structure(s) 135, the account management data structure(s) 145, the account management server(s) 140, the inter-account interaction server(s) 130), at least one of the plurality of users of the process 200, the first user of the process 200, the second user of the process 200, the first user of the process 250, the second user of the process 250, user(s) associated with at least one of the plurality of user payment accounts 305 of FIGS. 3A-3B, user(s) associated with at least one of the user payment accounts 310A-310N of FIGS. 3A-3B, the user associated with the donation account 410 of FIG. 4, other user(s) mentioned in FIG. 4 (e.g., Irene, Sally, John, Eddy, Anonymous), the user whose account is in focus in FIG. 5A, the user Bob in FIG. 5A, the user whose account is in focus in FIG. 5B, BankX in FIG. 5B, the user whose account is in focus in FIG. 6, other user(s) mentioned in FIG. 6 (e.g., Claire, Paul, Mae, Bo, AirX, NYC Nurses, Joe, Al), the user whose account is in focus in FIG. 7, user(s) of the account(s) about which data is included in the asset account data 815 of FIG. 8, user(s) of the account(s) about which data is included in the asset account data 844 of FIG. 8, the user of the selected asset account 865 of FIG. 8, the user of the selected asset account 847 of FIG. 8, or a combination thereof.

At operation 260, the automated account interaction system receives a plurality of asset transaction indications indicative of a plurality of asset transactions. Each of the plurality of asset transaction indications indicates that at least one of the plurality of asset accounts has performed one of the plurality of asset transactions. In some examples, operation 260 corresponds to, and/or includes, operation(s) 210 and/or 215 of the process 200.

Examples of the plurality of asset transactions include transaction(s) tracked and/or managed using the inter-account interaction server(s) 130, transaction(s) tracked and/or managed using the inter-account interaction data structure(s) 135, transaction(s) tracked and/or managed using the account management server(s) 140, transaction(s) tracked and/or managed using the account management data structure(s) 145, at least one of the plurality of payments of the process 200, the first payment of the process 200, the first asset transaction of the process 250, at least one of the recent transactions 315A of FIGS. 3A-3B, at least one of the recent transactions 315C of FIGS. 3A-3B, the selected payment 375 of FIG. 3B, at least one of the transfers listed in the personal transfer feed 425 of FIG. 4, Bob's payment of 50% of the headphone purchase in FIG. 5A, the user's grocery purchase in FIG. 5B, BankX's 25% cashback payment in FIG. 5B, at least one of the donations and/or transfers listed in the public transfer feed 630 of FIG. 6, at least one of the donations and/or transfers that is used to calculate the donation index 610 of FIG. 6, at least one of the donations and/or transfers that is used to calculate the donation index graph 620 of FIG. 6, one or more donations and/or transfers from the emergency fund 705 of FIG. 7 to a user, one or more donations and/or transfers to the emergency fund 705 of FIG. 7 from a user, one or more asset transactions of the asset transaction data 810 of FIG. 8, one or more asset transactions of the asset transaction data 840 of FIG. 8, the selected asset transaction 860 of FIG. 8, the selected asset transaction 842 of FIG. 8, another set of one or more transactions (e.g., purchase(s), transfer(s), donation(s)) described herein, or a combination thereof.

Examples of the plurality of asset transaction indications include at least one of the plurality of payment indications of the process 200, the first payment indication of the process 200, an indication of the recent transactions 315A (e.g., as in FIGS. 3A-3B), an indication of the recent transactions 315C (e.g., as in FIGS. 3A-3B), an indication of transaction(s) associated with any of the five tabs listed in the personal transfer feed 425 in FIG. 4, an indication of the headphone purchase of FIG. 5A, an indication of the grocery purchase of FIG. 5B, an indication of transaction(s) associated with any of the three purchases (e.g., coffee, groceries, movie) listed in the public transfer feed 630 in FIG. 6, an indication of a transaction for which the emergency fund 705 of FIG. 7 may be useful, indication(s) of one or more asset transactions of the asset transaction data 810 of FIG. 8, indication(s) of one or more asset transactions of the asset transaction data 840 of FIG. 8, an indication of the selected asset transaction 860 of FIG. 8, an indication of the selected asset transaction 842 of FIG. 8, an indication of another set of one or more transactions (e.g., purchase(s), transfer(s), donation(s)) described herein, or a combination thereof.

At operation 265, the automated account interaction system automatically selects a first asset transaction indication from the plurality of asset transaction indications based on a first output of one or more trained machine learning (ML)

models in response to input of the plurality of asset transaction indications into the one or more trained ML models. The first asset transaction indication indicates that a first asset account of the plurality of asset accounts has performed a first asset transaction of the plurality of asset transactions. The first asset account is associated with a first user of the plurality of users. In some examples, operation 265 corresponds to, and/or includes, operation(s) 215 and/or 220 of the process 200.

Examples of the first asset transaction can include the selected asset transaction 860, the selected asset transaction 842, the selected payment 375, the first payment of the process 200, and/or any of the other transaction(s) listed above in the description of operation 260 as examples of the plurality of asset transactions. Examples of the first asset transaction indication can include the first payment indication of the process 1200 and/or any of the transaction indication(s) listed above in the description of operation 260 as examples of the plurality of asset transaction indications. Examples of the first asset account can include a user account involved in the selected asset transaction 860, a user account involved in the selected asset transaction 842, the selected transferee user payment account 370, the first payment account of the process 1200, and/or any of the other account(s) listed above in the description of operation 255 as examples of the plurality of asset accounts. Examples of the first user can include a user of a user account involved in the selected asset transaction 860, a user of a user account involved in the selected asset transaction 842, a user of the transferee user payment account 370 involved in the selected payment 375, the first user of the process 200, and/or any of the user(s) listed above in the description of operation 255 as examples of the plurality of users.

Examples of the one or more ML models include the ML engine 830, the trained ML model(s) 835, the neural network 900, another ML system described herein, or a combination thereof. Examples of the first output include the output data 850, the selected asset transaction 860, the selected asset account 865, or a combination thereof. In an illustrative example, the first output includes the selected asset transaction 860. In an illustrative examples input of the plurality of asset transaction indications into the one or more trained ML models includes input of the asset transaction data 810 into the ML engine 830 and/or into the trained ML model(s) 835.

In some aspects, automatically selecting the first asset transaction indication from the plurality of asset transaction indications is based at least in part on a random selection from among the plurality of asset transaction indications. For instance, the one or more trained ML models can select a subset of the plurality of asset transaction indications based on the first output of the one or more trained ML models, and the automated account interaction system can randomly select the first asset transaction indication from the subset of the plurality of asset transaction indications.

In some aspects, the first asset transaction pays for a commodity of a particular category. Automatically selecting the first asset transaction indication from the plurality of asset transaction indications is based on the particular category of the commodity. The commodity can be, for example, a good and/or a service.

In some aspects, the first asset account performs the first asset transaction within a particular time period. Automatically selecting the first asset transaction indication from the plurality of asset transaction indications is based on the particular time period.

In some aspects, automatically selecting the first asset transaction indication from the plurality of asset transaction indications is based on a second quantity of the asset having been previously transferred from an account associated with the first user to a third asset account of the plurality of asset accounts associated with a third user of the plurality of users. In some examples, the account associated with the first user is the first asset account of the plurality of asset accounts. In some examples, the account associated with the first user is a fourth asset account of the plurality of asset accounts.

At operation 270, the automated account interaction system automatically selects a second asset account from the plurality of asset accounts based on a second output of the one or more trained ML models in response to input of information about the plurality of asset accounts into the one or more trained ML models. The second asset account is associated with a second user of the plurality of users. The second asset account has at least a first quantity of an asset. In some examples, operation 270 corresponds to, and/or includes, operation 225 of the process 200.

Examples of the second asset account can include the selected asset account 865, the selected asset account 847, the selected transferor user payment account 360, the second user payment account of the process 1200, and/or any of the other account(s) listed above in the description of operation 255 as examples of the plurality of asset accounts. Examples of the second user can include a user of the selected asset account 865, a user of the selected asset account 847, a user of the selected transferor user payment account 360, the second user of the process 1200, and/or any of the user(s) listed above in the description of operation 255 as examples of the plurality of users. Examples of the information about the plurality of asset accounts include the input data 805, the asset account data 815, the asset transaction data 810, the asset account data 844, the asset transaction data 840, or a combination thereof. In an illustrative example, the information about the plurality of asset accounts includes the asset account data 815. Input of the information about the plurality of asset accounts into the one or more trained ML models can include, for example, input of the asset account data 815 into the ML engine 830 and/or into the trained ML model(s) 835. Examples of the first quantity of the asset include the first quantity of funds of the process 200, at least a portion of an amount of the selected payment 375 of FIG. 3B, any of the amounts identified as being transferred between accounts of different users in the personal transfer feed 425 of FIG. 4, the 50% of the amount of the headphone purchase of FIG. 5A, the 25% of the amount of the grocery purchase of FIG. 5B, any of the amounts identified as being transferred between accounts of different users in the public transfer feed 630 of FIG. 6, an amount transferred from the emergency fund 705 of FIG. 7 to a user, an amount transferred to the emergency fund 705 of FIG. 7 from a user, at least a portion of an amount of the selected asset transaction 860 of FIG. 8, at least a portion of an amount of the selected asset transaction 842 of FIG. 8, the selected transfer amount 867 of FIG. 8, the selected transfer amount 849 of FIG. 8, another transfer amount and/or percentage described herein, or a combination thereof.

In some aspects, the automated account interaction system is configured to, and can, receive a location of the first user from a first user device corresponding to the first user, and receive a location of the second user from a second user device corresponding to the second user. The automated account interaction system can identify that the location of the first user and the location of the second user are within a shared region. In some examples, the automated account interaction system can automatically select the first asset transaction indication from the plurality of asset transaction indications based on the location of the first user and the location of the second user being within the shared region. In some examples, the automated account interaction system can automatically select the second asset account from the plurality of asset accounts based on the location of the first user and the location of the second user being within the shared region.

In some aspects, automatically selecting the second asset account from the plurality of asset accounts is at least partially based on a random selection from among the plurality of asset accounts. For instance, the one or more trained ML models can select a subset of the plurality of asset accounts based on the second output of the one or more trained ML models, and the automated account interaction system can randomly select the second asset account from the subset of the plurality of asset accounts.

In some aspects, automatically selecting the second asset account from the plurality of asset accounts is based on the second asset account having at least the first quantity of the asset.

In some aspects, automatically selecting the second asset account from the plurality of asset accounts is based on identifying that an account associated with the second user has performed a second asset transaction of the plurality of asset transactions. In some examples, the account associated with the second user is the second asset account of the plurality of asset accounts. In some examples, the account associated with the second user is a third asset account of the plurality of asset accounts.

In some aspects, the second asset account corresponds to a financial institution, such as a bank, a credit union, a loan institution, a credit card processor, a credit card issuer, a credit scoring institution, or a combination thereof.

At operation 275, the automated account interaction system automatically transfers the first quantity of the asset from the second asset account to the first asset account in response to automatically selecting the first asset transaction indication and automatically selecting the second asset account. In some examples, operation 275 corresponds to, and/or includes, operation(s) 230 and/or 240 of the process 200.

Examples of the transfer of the first quantity of the asset from the second asset account to the first asset account at operation 275 include the transfer of the first quantity of funds from the second user payment account to the first user payment at operation 230, the a transfer of at least a portion of an amount of a selected payment 375 from the selected transferor user payment account 360 to the selected transferee user payment account 370, transfer(s) identified in the personal transfer feed 425 from the user's account to an account of a second user (e.g., Irene, Sally, John, or Eddy) to pick up the second user's tab by transferring at least a portion of an amount associated with the second user's tab (e.g., one or more purchases), transfer(s) identified in the personal transfer feed 425 to the user's account from an account of another user (e.g., Sally, Anonymous) to pick up the user's tab by transferring at least a portion of an amount associated with the user's tab (e.g., one or more purchases), a transfer identified in the confirmation indicator message 505 to the user's account from Bob's account to transfer a portion (50%) of an amount associated with the user's headphone purchase, a transfer identified in the confirmation indicator message 555 to the user's account from BankX's account to transfer a portion (25%) of an amount associated with the user's grocery purchase, transfer(s) identified in the public transfer feed 630 from an account of a first user (e.g., Claire, Paul, AirX, "you" user) to an account of a second user (e.g., "you" user, Mae, Bo, NYC nurses, Joe, Al) to pick up the second user's tab by transferring at least a portion of an amount associated with the second user's tab (e.g., one or more purchases), a transfer of an amount from the emergency fund 705 of FIG. 7 to a user, a transfer of an amount to the emergency fund 705 of FIG. 7 from a user, a transfer of at least a selected transfer amount 867 (e.g., a selected percentage) of an amount of a selected asset transaction 860 from a selected asset account 865 to an asset account involved in the selected asset transaction 860, a transfer of at least a selected transfer amount 849 (e.g., a selected percentage) of an amount of a selected asset transaction 842 from a selected asset account 847 to an asset account involved in the selected asset transaction 842, another transfer described herein, or a combination thereof.

At operation 280, the automated account interaction system automatically communicates a confirmation indicator. The confirmation indicator indicates that (e.g., confirms that) the first quantity of the asset has been transferred from the second asset account to the first asset account. In some examples, operation 280 corresponds to, and/or includes, operation(s) 235 and/or 240 of the process 200.

Examples of the confirmation indicator include the confirmation indicator of operation 235 of the process 200, one or more communications transferred over the line of communication of operation 240 of the process 200, an indicator of transfer of at least a portion of an amount of a selected payment 375 from the selected transferor user payment account 360 to the selected transferee user payment account 370, any of the six indicators listed in the personal transfer feed 425 in FIG. 4, the confirmation indicator message 505 of FIG. 5A, the confirmation indicator message 555 of FIG. 5B, any of the six indicators listed in the public transfer feed 630 in FIG. 6, an indicator of a donation and/or transfer from the emergency fund 705 of FIG. 7 to a user, an indicator of a donation and/or transfer to the emergency fund 705 of FIG. 7 from a user, an indicator of a transfer of at least a selected transfer amount 867 (e.g., a selected percentage) of an amount of a selected asset transaction 860 from a selected asset account 865 to an asset account involved in the selected asset transaction 860, an indicator of a transfer of at least a selected transfer amount 849 (e.g., a selected percentage) of an amount of a selected asset transaction 842 from a selected asset account 847 to an asset account involved in the selected asset transaction 842, another transfer described herein, another indicator of a transfer described herein, or a combination thereof.

In some aspects, the first asset account performing the first asset transaction includes the first asset account transferring a second quantity of the asset. In some aspects, the first quantity of the asset is equal to the second quantity of the asset. In some aspects, the first quantity of the asset is less than the second quantity of the asset. In some aspects, automatically selecting the first asset transaction indication from the plurality of asset transaction indications is based on the first asset transaction indication indicating that the second quantity of the asset is less than or equal to a maximum eligibility threshold. In some aspects, automatically selecting the first asset transaction indication from the plurality of asset transaction indications is based on the first asset transaction indication indicating that the second quantity of the asset is greater than or equal to a minimum eligibility threshold.

In some aspects, based on the first asset transaction indication and the second asset account being selected, the automated account interaction system uses the first asset transaction and the second asset account to update the one or more trained ML models for use in identifying one or more additional asset transaction indications and/or one or more additional asset accounts for one or more additional transfers. Examples of such an update include the further training 875 based on the validation 845 in FIG. 8.

In some aspects, the automated account interaction system automatically identifies, using the one or more trained ML models, the first quantity of the asset to be at least a subset of an amount of the asset transferred during the first asset transaction. In such an aspect, the first quantity of the asset can be an example of the selected transfer amount 867. For instance, the one or more trained ML models can determine the first quantity of the asset to be a percentage, a fraction, and/or a subset of the amount of the asset transferred during the first asset transaction, as in the 50% of FIG. 5A, the 25% of FIG. 5B, the 25% of FIG. 6, or the 15% of FIG. 6.

In some aspects, the automated account interaction system is configured to, and can, generate a message identifying the first user and/or the second user. The confirmation indicator includes the message.

In some aspects, the confirmation indicator refers to the first user and/or the second user using one or more anonymized identifiers. In some examples, the automated account interaction system automatically anonymizes the first user by generating a first anonymized identifier for the first user. In some examples, the automated account interaction system automatically anonymizes the second user by generating a second anonymized identifier for the second user.

In some aspects, communicating the confirmation indicator includes sending the confirmation indicator to a first user device corresponding to the first user and/or to a second user device corresponding to the second user.

In some aspects, communicating the confirmation indicator includes publishing the confirmation indicator on a feed that is viewable by at least a subset of a plurality of user devices corresponding to the plurality of users. Examples of the feed include the personal transfer feed 425 and the public transfer feed 630.

In some aspects, publishing the confirmation indicator on the feed includes modifying a markup file corresponding to the feed to add the confirmation indicator. The automated account interaction system, and/or an associated server, can serve the markup file to a viewer device of the plurality of user devices. The feed is viewable by the viewer device upon transfer of the markup file to the viewer device. Examples of the markup file include the interfaces of FIGS. 4 and 6 that display the personal transfer feed 425 and the public transfer feed 630, respectively.

In some aspects, transferring the first quantity of the asset from the second asset account to the first asset account occurs within a first time period. The automated account interaction system is configured to, and can, calculate, based on a sum of the first quantity of the asset and a quantity of the asset corresponding to a plurality of other transfers of the asset occurring within the first time period, a first index representing a total quantity of the asset transferred within the first time period. In some examples, the confirmation indicator includes the first index. An example of the first index is the donation index 610 of FIG. 6. In some aspects, the automated account interaction system is configured to, and can, generate a graph. A first point on the graph corresponds to the first time period and identifies the first index. The graph includes one or more additional points in addition to the first point. Each additional point of the one or more additional points corresponds to an additional time period other than the first time period and identifies an additional index representing a total quantity of the asset transferred within the additional time period. In some examples, communicating the confirmation indicator includes communicating the graph. An example of the graph is the donation index graph 620 of FIG. 6.

In some aspects, the automated account interaction system is configured to, and can, initiate a line of communication between a first user device corresponding to the first user and a second user device corresponding to the second user in response to transferring the first quantity of the asset from the second asset account to the first asset account. In some examples, the line of communication includes transfer of audio recorded at one of the first user device and the second user device to another of the first user device and the second user device, as in the audio call 530 and/or the video call 535 of FIG. 5A. In some examples, the line of communication includes transfer of video recorded at one of the first user device and the second user device to another of the first user device and the second user device, as in the video call 535 of FIG. 5A. In some aspects, the line of communication includes transfer of one or more messages between the first user device and the second user device. The one or more messages include at least one of a string of text, an alphanumeric character, an image, a video, an audio clip, a motion graphic, an animation, an animated image, an icon, an emoji, an emoticon, or a combination thereof. Examples of the one or more messages include the predetermined response 510, the custom response 515, an audio recording via the microphone button 522, the audio call 530, and/or the video call 535. In some aspects, the one or more messages are prepared before automatically selecting a first asset transaction indication and before automatically selecting the second asset account, as in the predetermined response 510.

In some aspects, the asset(s) include money, funds, points, transit pass credit, store credit, monetary value, bank credit (e.g., as in a credit card), a loan, or a combination thereof. In some aspects, the asset(s) include objects that can be donated, such as the shoes of FIG. 6, food, clothing, vehicles, electronics, toys, water, or combinations thereof. In some aspects, the asset(s) include digital media and/or digital assets, for instance including one or more images, videos, audio clips, strings of characters, video games, software applications, cryptocurrencies, non-fungible tokens (NFTs), other tokens, or combinations thereof.

In some aspects, the automated account interaction system is configured to, and can, make the selection(s) of operation 265 and/or operation 270 in real-time as input data is still coming in, for instance as the plurality of asset transaction indications is still being received as in operation 260, and/or as information about the plurality of asset accounts is still being received and/or access as in operation 255.

In some cases, the process 250 can be initiated based on, and/or selection criteria for operation(s) 265 and/or 270 can be based on, calendar event(s) of a calendar of the second user. For instance, the second user can be encouraged to donate to the first user on the second user's birthday, or on another calendar event of the calendar of the second user. In some cases, the process 250 can be initiated based on, and/or selection criteria for operation(s) 265 and/or 270 can be based on calendar event(s) of a calendar of the first user. For instance, the second user can be encouraged to donate to the first user on the first user's birthday, or on another calendar event of the calendar of the first user. In some examples, calendar data from calendar(s) of the first user and/or the second user can be used as input(s) to the one or more ML models in operation(s) 265 and/or 270. Data from other time-based applications, such as to-do lists, appointment listings, ticket applications, and/or itineraries, can be used like the calendar data.

In some examples, the first user can be an organization, or a user representing an organization, such as a charity, a non-profit organization, a business, or a combination thereof.

In some examples, the first asset transaction indication is an indication of a first asset transaction that is planned, scheduled, and/or configured to happen, but that has not yet happened. For instance, the first asset transaction can be set up to occur only if the first asset account includes sufficient funds, which might only occur after the transfer of operation 275 in some examples. This way, the process 250 can fund prospective transactions, not just transactions that have already happened.

In some examples, the process 250 for automated account interaction repeats (e.g., starts back again from operation 255) after the process 250 for automated account interaction ends at and/or following operation 275 and/or operation 280.

FIG. 3A is a conceptual diagram 300 illustrating a plurality of user payment accounts 305. Information corresponding to the plurality of user payment accounts 305 may be stored at the account management data structures 145. The inter-account interaction servers 130 may request the account management servers 140 to retrieve the information corresponding to the plurality of user payment accounts 305 from the account management data structures 145. The account management servers 140 may retrieve the information corresponding to the plurality of user payment accounts 305 from the account management data structures 145 and send the information corresponding to the plurality of user payment accounts 305 to the inter-account interaction servers 130. The inter-account interaction servers 130 may receive the information corresponding to the plurality of user payment accounts 305 from the account management servers 140.

The plurality of user payment accounts 305 includes N user payment accounts, wherein N is a positive integer greater than 4. In particular, the plurality of user payment accounts 305 includes a first user payment account 310A, a second user payment account 310B, a third user payment account 310C, a fourth user payment account 310D, and so forth, up to an Nth user payment account 310N. Information is illustrated for each of the user payment accounts 305. Different types of information is illustrated for each of the user payment accounts 305 depending on the type of account.

The information about the first user payment account 310A includes a list of recent transactions 315A whose payments were paid for using the first user payment account 310A. Each item in the list of recent transactions 315A includes a payment indicator corresponding to a particular payment paid by the first user payment account 310A. This suggests that the first user payment account 310A is not a donation account, and may for instance be a credit account, a debit account, a checking account, a savings account, or a combination thereof. The list of recent transactions 315A includes: a $3.99 Latte on 11/13/2020 at 3:12 pm at CoffeeTime in Los Angeles (LA); a $54.99 Chair on 11/09/2020 at 1:09 pm at FRNTR in NYC; a $14.99 Shirt on 11/02/2020 at 1:09 pm at APPRL in New York City (NYC); and $12.99 Eggs on 10/24/2020 at 9:50 am at Brunchery in San Francisco (SF).

The information about the second user payment account 310B identifies that the second user payment account 310B is a donation account with a donation account balance 320B of $50.00, and that the user associated with the second user payment account 310B has a location 330B in NYC.

The information about the third user payment account 310C includes a list of recent transactions 315C whose payments were paid for using the first user payment account 310C. Each item in the list of recent transactions 315C includes a payment indicator corresponding to a particular payment paid by the third user payment account 310C. This suggests that the third user payment account 310C is not a donation account, and may for instance be a credit account, a debit account, a checking account, a savings account, or a combination thereof. The list of recent transactions 315C includes: $7.99 Tacos on 11/18/2020 at 2:19 pm at TacoTime in LA; a $4.99 Candybar on 11/07/2020 at 8:45 pm at CNDY in LA; and $22.99 Jeans on 10/12/2020 at 6:20 pm at Denim in LA.

The information about the fourth user payment account 310D identifies that the fourth user payment account 310D is a donation account with a donation account balance 320D of $15.00, and that the user associated with the second user payment account 310D has a location 330D in LA.

The information about the Nth user payment account 310N identifies that the Nth user payment account 310N is a donation account with a donation account balance 320N of $3.00, and that the user associated with the Nth user payment account 310N has a location 330N in SF.

FIG. 3B is a conceptual diagram 350 illustrating automatic selection of a transferor and a transferee for a transfer from the plurality of user payment accounts 305 of FIG. 3A. The conceptual diagram illustrates the same information about the same plurality of user payment accounts 305 as FIG. 3A, but also identifies selections 340 made by the inter-account interaction servers 130 from the plurality of user payment accounts 305 based on section criteria 380. The selections 340 include a selected transferor user payment account 360, a selected transferee user payment account 370, and a selected payment 375 associated with the selected transferee user payment account 370.

In the example of FIG. 3B, the inter-account interaction servers 130 select the fourth user payment account 310D as the transferor user payment account 360. In the example of FIG. 3B, the inter-account interaction servers 130 select the third user payment account 310C as the transferee user payment account 370, and the payment of $7.99 for the tacos on 11/18/2020 at 2:19 pm at TacoTime in LA as the selected payment 375.

The first of the selection criteria 380 indicates that the location associated with the selected transferor user payment account 360 and the location associated with the selected transferee user payment account 370 (or at least the selected payment 375) should match. In this example, the location 330D of the selected transferor user payment account 360 (the fourth user payment account 310D) is Los Angeles, and the location of the selected payment 375 (and all other payments in the recent transactions 315A list) is Los Angeles. Thus, the first of the selection criteria 380 is met. The second user payment account 310B also has a location 330B in Los Angeles, and thus also could have also met the first of the selection criteria 380 if the same selected payment 375 was selected. The Nth user payment account 310N has a location 330N in San Francisco, and thus would not have met the first of the selection criteria 380 if the same selected payment 375 was selected.

The second of the selection criteria 380 indicates that the transferor account balance must exceed the amount (the quantity of funds paid) of the selected payment 375. In this example, the selected payment 375 is a $7.99 payment, and the selected transferor user payment account 360 (the fourth user payment account 310D) has a balance 320D of $15.00. Because $15.00 exceeds $7.99, the second of the selection criteria 380 is met. The second user payment account 310B has a balance 320B of $50.00, which is also greater than $7.99, and thus also could have also met the second of the second of the selection criteria 380 if the same selected payment 375 was selected. The Nth user payment account 310N has a balance 320N of $3.00, which is less than $7.99, and thus would not have met the second of the second of the selection criteria 380 if the same selected payment 375 was selected.

The third of the selection criteria 380 indicates that the quantity of funds paid in the selected payment 375 must be below $30.00. In this example, the selected payment 375 is a $7.99 payment, which is less than $30.00. Thus, the selected payment 375 meets the third of the selection criteria 380. In fact, all of the payments in the recent transactions 315A and the recent transactions 315C, other than the $54.99 chair in the recent transactions 315A, would fall below $30.00 and therefore meet the third of the selection criteria 380.

The fourth of the selection criteria 380 indicates that the selected transferor user payment account 360 must be a donation account. In this example, the account information for the selected transferor user payment account 360 (the fourth user payment account 310D) identifies a donation account balance 320D, confirming that the selected transferor user payment account 360 (the fourth user payment account 310D) is a donation account. The second user payment account 310B and the Nth user payment account 310N are also donation accounts, and would also satisfy the fourth of the selection criteria 380. The first user payment account 310A and the third user payment account 310C are not donation accounts, and would not satisfy the fourth of the selection criteria 380.

The fifth of the selection criteria 380 indicates that, other than the first four of the selection criteria 380, the selections 340 are to be made randomly. Thus, the selections 340 are made randomly from a subset of selections 340 that meet the first four selection criteria 380.

In some examples, the selected payment 375 is selected first by the inter-account interaction servers 130, followed by selection of the selected transferor user payment account 360 by the inter-account interaction servers 130. In such examples, once the inter-account interaction servers 130 selects the selected payment 375 to be the $7.99 taco purchase in Los Angeles, the inter-account interaction servers 130 are able to narrow down the subset of user payment accounts with locations 330A-N based in Los Angeles to satisfy the first of the selection criteria 380. Other selection criteria 380 with interdependencies may be handled similarly.

In some examples, the transferor user payment account 360 is selected first by the inter-account interaction servers 130, followed by selection of the selected payment 375 by the inter-account interaction servers 130. In such examples, once the inter-account interaction servers 130 selects the transferor user payment account 360 to be the fourth user payment account 310D (with a location 330D in Los Angeles), the inter-account interaction servers 130 are able to narrow down the subset of payment indicators in the recent transactions 315A and the recent transactions 315C in which the payment occurred in Los Angeles to satisfy the first of the selection criteria 380. Other selection criteria 380 with interdependencies may be handled similarly.

In some examples, the inter-account interaction servers 130 may select the selected payment 375 and the selected transferor user payment account 360 in parallel, contemporaneously, and/or simultaneously. For instance, the inter-account interaction servers 130 can select random selections for both the selected payment 375 and the selected transferor user payment account 360. Certain criteria of the selection criteria 380 that do not have interdependencies, such as the third and fourth of the selection criteria 380, can be applied before this selection process to immediately remove certain possible selections. The random selections can be discarded if all of the selection criteria 380 are not met. If the random selections are discarded, the inter-account interaction servers 130 can select random selections again for both the selected payment 375 and the selected transferor user payment account 360. Again, certain possible selections can be removed ahead of time. This process can continue until the random selection satisfy all of the selection criteria 380.

FIG. 4 is a conceptual diagram 400 illustrating a donation account overview graphical user interface (GUI) with information about a user's donation account. The conceptual diagram 400 illustrates a mobile handset 405 displaying the donation account overview GUI on a display screen of the mobile handset 405. The mobile handset 405 may be a user device 120, such as a mobile device 110.

The donation account overview GUI includes information about a donation account 410, titled "My Donation Account," indicating that the donation account overview GUI includes information about a donation account associated with a user of the mobile handset 405. The donation account overview GUI identifies an available balance 415 of the donation account as $14.00.

The donation account overview GUI identifies that the user has a donation score 420 of 50. The donation score 420 may be based on how many times the user has donated to other users in total, the total quantity of funds that the user has donated to other users, how many times the user has donated to other users within a certain time period (e.g., the last year, the last month, the last week, the last day), the total quantity of funds that the user has donated to other users within a certain time period (e.g., the last year, the last month, the last week, the last day), a rate at which the user donates to other users (e.g., donations per increment of time) in total, a rate at which the user donates to other users (e.g., donations per increment of time) within a certain time period (e.g., the last year, the last month, the last week, the last day), the total quantity of funds that the user has received in donations from other users, how many times the user has received donations from other users within a certain time period (e.g., the last year, the last month, the last week, the last day), the total quantity of funds that the user has received in donations from other users within a certain time period (e.g., the last year, the last month, the last week, the last day), a rate at which the user received donations other users (e.g., donations per increment of time) in total, a rate at which the user received donations from other users (e.g., donations per increment of time) within a certain time period (e.g., the last year, the last month, the last week, the last day), or a combination thereof.

The donation account overview GUI includes a personal transfer feed 425. The personal transfer feed 425 may, in some cases, be private, so that only the user can see the personal transfer feed 425. Alternately, the user can set the personal transfer feed 425 (or a user-selected subset of transfers therein) to be public, so that other users may view the personal transfer feed 425. The personal transfer feed 425 includes both transfers from the user's donation account to other user payment accounts, and transfers from other user's donation accounts to any user payment account of the user. In particular, the personal transfer feed 425 identifies that, on Nov. 12, 2020 at 11:47 AM, the user picked up Irene's tab (−$3.50); on Nov. 11, 2020 at 6:27 PM, Sally picked up the user's tab (+$3.00); on Nov. 10, 2020 at 2:31 PM, the user picked up John's tab (−$2.50); on Nov. 10, 2020 at 9:40 AM, the user funded the user's Donation Account (+$20.00); on Nov. 9, 2020 at 11:47 AM, the user picked up Eddy's tab (−$3.50); and on Nov. 8, 2020 at 6:27 AM, an anonymous user picked up the user's tab (+$2.00).

The donation account overview GUI also includes a fund 430 button allowing the user to fund their donation account further, for example by cashing a check or transferring funds from another user payment account associated with the user. The donation account overview GUI also includes a withdraw 440 button allowing the user to withdraw funds from their donation account, for example to transfer those funds to another user payment account associated with the user. The donation account overview GUI also includes a "tap to type 450" interface allowing the user to type an input, such as a request.

FIG. 5A is a conceptual diagram 500 illustrating an indicator message graphical user interface (GUI) with an indicator message identifying receipt of a donation from another account. The confirmation indicator message GUI includes a box with an indicator message 505, which may be an example of the confirmation indicator communicated in operation 235. The confirmation indicator message 505 indicates that a user Bob just paid for 50% of a $75.99 headphone purchase by the user of the mobile handset 405. The confirmation indicator message GUI incudes virtual buttons allowing the user to choose one of a set of predetermined responses 510, such as the word "Thanks!," a series of heart emojis, or a series of "thumbs up" emojis. Selection of one of these predetermined responses at the confirmation indicator message GUI sends an instruction from the mobile handset 405 to the inter-account interaction servers 130, which receives the instruction and sends the selected predetermined response to a user device 120 associated with the user Bob in response.

The confirmation indicator message GUI incudes a "prepare a custom response 515" interface with a "tap to type 520" interface allowing a user to type a custom response to the user Bob, and a microphone button 522 allowing the user to record a custom response with audio and/or video for the user Bob. Input of a custom message using either or both interfaces at the confirmation indicator message GUI sends an instruction from the mobile handset 405 to the inter-account interaction servers 130, which receives the instruction and sends the custom response to a user device 120 associated with the user Bob in response.

The confirmation indicator message GUI incudes a "invite Bob to a call 525" interface with an "audio call 530" button allowing the user to invite the user Bob to an audio call, and a "video call 535" button allowing the user to invite the user Bob to a video call. Receipt of an input pressing either the "audio call 530" button or the "video call 535" button at the confirmation indicator message GUI sends an instruction from the mobile handset 405 to the inter-account interaction servers 130, which receives the instruction and sends an invitation to join an audio call and/or a video call to a user device 120 associated with the user Bob in response. If the inter-account interaction servers 130 receives an acceptance of the invitation from the user device 120 associated with the user Bob, the inter-account interaction servers 130 can then initiate an audio call connection and/or a video call connection between the mobile handset 405 and the user device 120 associated with the user Bob.

FIG. 5B is a conceptual diagram 550 illustrating an indicator message graphical user interface (GUI) with an indicator message identifying receipt of a cashback reward. The confirmation indicator message GUI includes a box with an indicator message 555, which may be an example of the confirmation indicator communicated in operation 235. The confirmation indicator message 555 indicates that the user of the mobile handset was randomly selected to receive 25% cash back on the user's $85.99 grocery purchase, the cash back reward being received from financial entity BankX. The confirmation indicator message graphical user interface (GUI) identifies the cash back reward amount as $21.50, and includes an image of a pair of dice to highlight that this was a random selection. The confirmation indicator message graphical user interface (GUI) includes a "Thanks!" button that allows the user to close the confirmation indicator message graphical user interface (GUI).

FIG. 6 is a conceptual diagram 600 illustrating a donation index graphical user interface (GUI) with a donation index, donation index graph, and donation feed. The inter-account interaction servers 130 can access information tracking the interactions stored in the inter-account interaction data structures 135 and generate a donation index 610. The donation index 610 may represent the total sum quantity of funds transferred in all donations transactions (and/or other types of transactions) by all users of the service run by the inter-account interaction servers 130 within a particular window of time. The inter-account interaction servers 130 may calculate the donation index 610. The particular window of time may be, for example, 30 seconds, 1 minute, 2 minutes, 3 minutes, 4 minutes, 5 minutes, 6 minutes, 7 minutes, 8 minutes, 9 minutes, 10 minutes, 11 minutes, 12 minutes, 13 minutes, 14 minutes, 15 minutes, 16 minutes, 17 minutes, 18 minutes, 19 minutes, 20 minutes, 21 minutes, 22 minutes, 23 minutes, 24 minutes, 25 minutes, less than 30 seconds, more than 25 minutes, or a value in between any previously listed duration of time. The donation index GUI identifies that the donation index 610 is currently $1657.98, and has gone up by 2.64% over the course of one day.

Values of the donation index 610 can be graphed over time over the course of a longer period of time that includes multiple of the windows of time. The donation index graph 620 in the donation index GUI is a visual representation of such a graph. The donation index graph 620 is a representation of how generous a community is being over time. The donation index graph 620 shows fluctuations in the donation index 610 over the course of a time period of one day. The current value of the donation index 610 ($1657.98) is the right-most point of the donation index graph 620, with all points to the left of the right-most point representing previous values of the donation index 610 from earlier in the day. Virtual buttons are illustrated above the donation index graph 620 allowing the user of the mobile handset 405 to extend the donation index graph 620 to cover a longer period of time, such as a week, a month, three months, six months, or a year.

The donation index GUI includes a public transfer feed 630 identifying various transfers made in the community of users of the service run using the inter-account interaction servers 130. The public transfer feed 630 may be a live feed, a periodically updated feed, a static feed, or a combination thereof. The public transfer feed 630 may be generated for all viewer users (or all viewer users meeting certain criteria, such as all viewer users in a certain area or region) and served from the inter-account interaction servers 130 to the mobile handset 405 and all other viewer devices that request to access the public transfer feed 425. For instance, the public transfer fees 630 indicates that, on Nov. 12, 2020 at 11:47 AM, Claire paid for a coffee for the user of the mobile handset 405 ($6.50); on Nov. 11, 2020 at 6:27 PM, Paul paid for Mae's groceries ($89.90); on Nov. 10, 2020 at 2:31 PM, Bo got 25% surprise cashback ($57.33); on Nov. 10, 2020 at 9:40 AM, company AirX donated 3 k shoes to NYC nurses; on Nov. 9, 2020 at 11:47 AM, the user of the mobile handset 405 paid for Joe's movie ($12.99); on Nov. 8, 2020 at 6:27 AM, Al got 15% surprise cashback ($37.42).

FIG. 7 is a conceptual diagram 700 illustrating an emergency fund graphical user interface (GUI). The emergency fund GUI describes an emergency fund 705. The emergency fund GUI states that: "If you have an urgent problem and need financial help, you can reach out to our virtual Agent by typing "Help" in the Tap to Type box or pressing the "Help" button below. Based on information you provide about your situation, the virtual Agent may be able to automatically approve an Emergency Fund request and quickly disburse funds to solve your problem. The Emergency Fund is a pool of funds available to the community to cover emergencies. Though not required, you can contribute the money you received back into the Fund once you are able to."

The emergency fund GUI includes a "Help! 710" button that the user of the mobile handset 405 can press, as well as a "tap to type 750" text string input interface. Selection of the "Help! 710" button, or typing "help" or a similar message in the "tap to type 750" text string input interface, causes the mobile handset 405 to send an instruction to the inter-account interaction servers 130, which receives the instruction. The inter-account interaction servers 130 can query the user's account information from the account management servers 140 and/or account management data structures 145. Based on the user's account information and/or additional context, such as context written by the user in the "Tap to type 750" interface or context provided by the user in response to a request for more information sent to the mobile handset 405 from the inter-account interaction servers 130, the inter-account interaction servers 130 can automatically determine whether the user qualifies for transfer of emergency funds from an emergency fund account, and if so the quantity of funds to be transferred to the user's user payment account from the emergency fund account. The emergency fund account may be a user payment account associated with a financial institution, or a user payment account associated with a community. In some cases, the inter-account interaction servers 130 may also reach out to a human agent to review the user's account information and/or additional context to help determine whether the user qualifies for transfer of emergency funds from an emergency fund account, and if so the quantity of funds to be transferred to the user's user payment account from the emergency fund account.

FIG. 8 is a block diagram illustrating a process 800 for automated payment selection, automated account selection, and/or automated account interaction using a machine learning (ML) engine 830. The ML engine 830 can include one or more trained ML models 835. The ML engine 830 can train the one or more trained ML models 835 using training data 820 in an initial training 825. The ML engine 830, and/or the trained ML model(s) 835, can include, for example, or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof. The neural network (NN) 900 can be an example of the ML engine 830 and/or the trained ML model(s) 835. Examples of the ML engine 830, and/or the trained ML model(s) 835, can include the one or more ML models of the process 250, the NN 900, another ML system described herein, or a combination thereof.

The one or more trained ML models 835 of the ML engine 830 receive input data 805 as inputs to at least one of the one or more trained ML models 835. The input data 805 includes asset transaction data 810, asset account data 815, or both. The asset transaction data 810 includes information about various transactions, such as purchases. The asset account data 815 includes information about various asset accounts, such as user purchase accounts and/or donation accounts. In some examples, the input data 805 also includes selection criteria, such as the selection criteria 380 of FIG. 3B.

Examples of the asset transaction data 810 include information stored in the inter-account data structure(s) 135 about transaction(s), information stored in the account management data structure(s) 145 about transaction(s), information about transaction(s) managed by the account management server(s) 140, information about transaction(s) involved in interactions managed by the inter-account interaction server(s) 130, the plurality of payment indications of the process 200, the plurality of asset transaction indications of the process 250, information about the recent transactions 315A, information about the recent transactions 315C, information about transactions and/or transfers by accounts mentioned in the personal transfer feed 425, information about the headphone purchase of FIG. 5A, information about the grocery purchase of FIG. 5B, information about transactions and/or transfers by accounts mentioned in the public transfer feed 630, information about other transaction(s) and/or transfer(s) and/or donation(s) described herein, or a combination thereof.

Examples of the asset account data 815 include information stored in the inter-account data structure(s) 135 about account(s), information stored in the account management data structure(s) 145 about account(s), information about account(s) managed by the account management server(s) 140, information about account(s) involved in interactions managed by the inter-account interaction server(s) 130, information about the plurality of user payment accounts of the process 200, the information about the plurality of asset accounts of the process 250, information about the plurality of user payment accounts 305 (e.g., donation account balances 320B-320N, locations 330B-330N), information about the user's donation account 410 (e.g., the available balance 415, the donation score 420), information about the accounts mentioned in the personal transfer feed 425, information about the user's account in FIG. 5A, information about the account of user Bob in FIG. 5A, information about the user's account in FIG. 5B, information about the account of BankX in FIG. 5B, information about the user's account of FIG. 6, information about at least one of the accounts of the other users mentioned in FIG. 6 (e.g., Claire, Paul, Mae, Bo, AirX, NYC Nurses, Joe, Al), information about the user's account in FIG. 7, information about the emergency fund 705 in FIG. 7, information about other accounts described herein, or a combination thereof.

An automated account interaction system provides at least some of the input data 805 (e.g., the asset transaction data 810, the asset account data 815, and/or the selection criteria) as input(s) to at least one of the trained ML models 835. In response to receiving at least some of the input data 805 as input(s), the at least one of the trained ML models 835 outputs output data 850. The output data 850 includes a selected asset transaction 860, a selected asset account 865, and/or a selected transfer amount 867. The selected asset account 865 can be an account to draw a donation from. The selected asset transaction 860 can be a transaction that the donation from the selected asset account 865 pays at least partially for. The selected transfer amount 867 can be an amount of the selected asset transaction 860 that the donation from the selected asset account 865 pays for.

For example, in the process 200 of FIG. 2A, the first payment is an example of the selected asset transaction 860, the second user payment account is an example of the selected asset account 865, and the first quantity of funds is an example of the selected transfer amount 867. In the process 250 of FIG. 2B, the first asset transaction is an example of the selected asset transaction 860, the second asset account is an example of the selected asset account 865, and the first quantity of the asset is an example of the selected transfer amount 867. In FIG. 3B, the selected payment 375 is an example of the selected asset transaction 860, the selected transferor user payment account 360 is an example of the selected asset account 865, and an amount of at least a portion of the selected payment 375 to be paid by the selected transferor user payment account 360 is an example of the selected transfer amount 867. In the personal transfer feed 425 of FIG. 4, each "tab" of a user account (e.g., "Irene," "your," "John," "Eddy," "your") is an example of the selected asset transaction 860, each account (e.g., "You," "Sally," "You," "You," and "Anonymous") that is "picking up" (paying for) a tab is an example of the selected asset account 865, and an amount of at least a portion of the tab to be paid by the account picking up the tab (e.g., $3.50, $3.00, $2.50, $3.50, $2.00) is an example of the selected transfer amount 867. In FIG. 5A, the headphone purchase is an example of the selected asset transaction 860, Bob's account is an example of the selected asset account 865, and 50% is an example of the selected transfer amount 867. In FIG. 5B, the grocery purchase is an example of the selected asset transaction 860, BankX's account is an example of the selected asset account 865, and 25% is an example of the selected transfer amount 867. In the public transfer feed 630 of FIG. 6, each purchase by a user account (e.g., "your," "Mae," "Bo," "NYC nurses," "Joe," "Al") that is being paid for by someone else is an example of the selected asset transaction 860, each account (e.g., "Claire," "Paul," cashback-giving entity, "AirX," "You") that is paying for such a purchase is an example of the selected asset account 865, and an amount of at least a portion of the purchase or asset to be paid or transferred by the paying account (e.g., $6.50, $89.90, $57.33, 25%, 3 k shoes, $12.99, $37.42, 15%) is an example of the selected transfer amount 867. In FIG. 7, a transaction to be at least partially paid for using the emergency fund 705 can be an example of the selected asset transaction 860, an account associated with the emergency fund 705 is an example of the selected asset account 865, and an amount of at least a portion of the transaction to be paid for using the emergency fund 705 can be an example of the selected transfer amount 867.

In some examples, the output data 850 can also include a second selected asset account, which can be an account associated with the selected asset transaction 860. For example, in the process 200, the first user payment account is an example of the second selected asset account. In the process 250, the first asset account is an example of the second selected asset account. In FIG. 3B, the selected transferee user payment account is an example of the second selected asset account. In FIG. 4, the account (e.g., "Irene," "your," "John," "Eddy," "your") is that has the tab that is being picked up (paid for) is an example of the second selected asset account. In FIG. 5A, the user's account is an example of the second selected asset account. In FIG. 5B, the user's account is an example of the second selected asset account. In FIG. 6, the account (e.g., "your," "Mae," "Bo," "NYC nurses," "Joe," "Al") who is receiving the donation (e.g., whose purchase is being paid for) is an example of the second selected asset account. In FIG. 7, the user's account is an example of the second selected asset account.

In some examples, the selected asset transaction 860 can include more than one transaction, grouped together so that at last a portion (e.g., based on the selected transfer amount 867) of the total amount for the group of transactions is paid for by the selected asset account 865. The group of transactions can include more than one transaction within a shared time period. For instance, a user could buy a coffee, and then a few minutes later, buy another coffee—and the selected asset transaction 860 can include both transactions. The group of transactions can include more than one transaction from a shared merchant and/or location. For example, the selected asset transaction 860 can include multiple purchases by a user from the same store.

The selected transfer amount 867 can be expressed as a percentage, a fraction, a relative quantity and/or amount, an absolute quantity and/or amount, or a combination thereof.

In some examples, different trained ML models from the trained ML model(s) 835 output different types of the output data 850. For instance, in some examples, a first trained ML model of the trained ML model(s) 835 outputs the selected asset transaction 860, a second trained ML model one of the trained ML model(s) 835 outputs the selected asset account 865, and a third trained ML model one of the trained ML model(s) 835 outputs the selected transfer amount 867. In some examples, any two, or all three, of these types of output data 850 can be output by a single trained ML model of the trained ML model(s) 835.

In some examples, different trained ML models from the trained ML model(s) 835 receive different types of the input data 805. For instance, in some examples, a first trained ML model of the trained ML model(s) 835 receives the asset transaction data 810 as input(s), a second trained ML model one of the trained ML model(s) 835 receives the asset account data 815 as input(s). In some examples, both of these types of input data 805 can be received by a single trained ML model of the trained ML model(s) 835.

In an illustrative example, a first trained ML model of the trained ML model(s) 835 receives as input(s) the asset transaction data 810 and outputs the selected asset transaction 860 and/or the selected transfer amount 867, and a second trained ML model of the trained ML model(s) 835 receives as input(s) the asset account data 815 and outputs the selected asset account 865. In another illustrative example, a first trained ML model of the trained ML model(s) 835 receives as input(s) the asset transaction data 810 and the asset account data 815, and outputs the selected asset transaction 860, the selected asset account 865, and/or the selected transfer amount 867.

The trained ML model(s) 835 can select the selected asset transaction 860, the selected asset account 865, and/or the selected transfer amount 867 based on certain selection criteria (e.g., selection criteria 380), which may be part of the input data 805. Using the selection criteria 380 as an example, the selected asset transaction 860 would need to take place in a matching location that the user of the selected asset account 865 is in, a balance of the selected asset account 865 would need to exceed the amount of the selected asset transaction 860, the selected asset transaction 860 would need to be less than $30, and the selected asset account 865 must be a specific type of account (a donation account). Other types of criteria may be used, which may include objective criteria and/or subjective criteria. Objective criteria may include locations, geofences, threshold amounts of an asset, and the like. Subjective criteria may include, for instance, a determination that a user performing the selected asset transaction 860 is "in need," for instance based on an analysis of the user's account balances, transaction history, debts, credit scores, income (e.g., salaries), investments, expenses (e.g., rent, mortgage, bills, taxes, school payments), or combinations thereof. Subjective criteria may include, for instance, a determination that a user performing the selected asset transaction 860 is similar to other users to whom the selected asset account 865 has donated to (e.g., who the user of the selected asset account 865 has chosen to donate to). Subjective criteria may include, for instance, a determination that the selected asset transaction 860 is similar to other transactions that the selected asset account 865 has donated to at least partially pay for (e.g., that the user of the selected asset account 865 has chosen to donate to at least partially pay for). In some examples, the selected transfer amount 867 can be selected based on the selection criteria. For instance, if a maximum donation amount threshold of the selection criteria is 25$, and the selected asset transaction 860 is a $100 transaction, then the selected transfer amount 867 can be selected to be 25% of the selected asset transaction 860 so that the donation amount falls under (does not exceed) the maximum donation amount threshold.

In some examples, the first user can be an organization, or a user representing an organization, such as a charity, a non-profit organization, a business, or a combination thereof. Objective criteria, in this case, can indicate that the organization needs to be a specific type of organization, or cannot be another type of organization. For example, an objective criteria can specify that the organization must be non-profit, and/or cannot be for-profit. Subjective criteria can include, for instance, a determination that the organization is similar to other organizations that the user of the selected asset account 865 has previously donated to. For instance, if the user of the selected asset account 865 has previously donated to a Save the Whales organization, a Save the Elephants organization may fit such a criterion, while a for-profit company might not fit such a criterion.

In some cases, donations can be timed based on, and/or the selection criteria can be based on, calendar event(s) of a calendar of a user of the selected asset account 865. For instance, a first user can be encouraged to donate to a second user on the first user's birthday, or on another calendar event of the calendar of the first user. In some cases, donations can be timed based on, and/or the selection criteria can be based on, calendar event(s) of a calendar of a user that performs the selected asset transaction 860. For instance, a first user can be encouraged to donate to a second user on the second user's birthday, or on another calendar event of the calendar of the second user. In some examples, the input data 805 can include the calendar of the user of the selected asset account 865, other data from a device of the user of the selected asset account 865, the calendar of a user that performs the selected asset transaction 860, other data from a device of the user that performs the selected asset transaction 860, or a combination thereof.

The ML engine 830 can perform an initial training 825 of the trained ML model(s) 835 using training data 820. The training data 820 can include asset transaction data 840, asset account data 844, selected asset transaction(s) 842, selected asset account(s) 847, selected transfer amount(s) 849, or a combination thereof. The asset transaction data 840 can include information about transaction(s), similarly to the asset transaction data 810. In some examples, the asset transaction data 840 can include at least a subset of the asset transaction data 810. In some examples, the asset transaction data 810 can include at least a subset of the asset transaction data 840. The selected asset transaction(s) 842 can include one or more asset transactions previously selected from the asset transaction data 840. The asset account data 844 can include information about account(s), similarly to the asset account data 815. In some examples, the asset account data 844 can include at least a subset of the asset account data 815. In some examples, the asset account data 815 can include at least a subset of the asset account data 844. The selected asset account(s) 847 can include one or more asset accounts previously selected from the asset account data 844. The selected transfer amount(s) 849 can include one or more amounts previously selected corresponding to the selected asset transaction(s) 842 and/or the selected asset account(s) 847.

In some examples, the ML engine 830 can perform further training 875 of the trained ML model(s) 835 based on validation 845, in some cases in real-time as additional selections are being made by the trained ML model(s) 835. For instance, in cases where at least a subset of the input data 805 matches at least a subset of the training data 820 (e.g., at least a subset of the asset transaction data 810 matches at least a subset of the asset transaction data 840 and/or at least a subset of the asset account data 815 matches at least a subset of the asset account data 844), validation 845 can check whether the selected asset transaction(s) 860 match the selected asset transaction(s) 842. If these match, the ML engine 830 can update the trained ML model(s) 835 via the further training 875 by strengthening the weights leading to the selection of the selected asset transaction(s) 860, or can add new weights leading to the selection of the selected asset transaction(s) 860, to the trained ML model(s) 835. If these do not match, the ML engine 830 can update the trained ML model(s) 835 via the further training 875 by weakening or removing the weights leading to the selection of the selected asset transaction(s) 860 from the trained ML model(s) 835.

In cases where at least a subset of the input data 805 matches at least a subset of the training data 820, validation 845 can check whether the selected asset account(s) 865 match the selected asset account(s) 847. If these match, the ML engine 830 can update the trained ML model(s) 835 via the further training 875 by strengthening the weights leading to the selection of the selected asset account(s) 865, or can add new weights leading to the selection of the selected asset account(s) 865, to the trained ML model(s) 835. If these do not match, the ML engine 830 can update the trained ML model(s) 835 via the further training 875 by weakening or removing the weights leading to the selection of the selected asset account(s) 865 from the trained ML model(s) 835.

In cases where at least a subset of the input data 805 matches at least a subset of the training data 820, validation 845 can check whether the selected transfer amount(s) 867 match the selected transfer amount(s) 849. If these match, the ML engine 830 can update the trained ML model(s) 835 via the further training 875 by strengthening the weights leading to the selection of the selected transfer amount(s) 867, or can add new weights leading to the selection of the selected transfer amount(s) 867, to the trained ML model(s) 835. If these do not match, the ML engine 830 can update the trained ML model(s) 835 via the further training 875 by weakening or removing the weights leading to the selection of the selected transfer amount(s) 867 from the trained ML model(s) 835.

In some cases, validation 845 can be based on feedback 870 received by the ML engine 830 from user(s) (e.g., the user(s) of the selected asset account(s) 865, the user(s) that performed the selected asset transaction(s) 860). The feedback 870 can be about the selected asset transaction 860, the selected asset account 865, and/or the selected transfer amount 867. If the feedback 870 is positive, the ML engine 830 can update the trained ML model(s) 835 via the further training 875 by strengthening the weights leading to these selection(s) of at least a subset of the output data 850, or can add new weights leading to the selection(s) of at least a subset of the output data 850, to the trained ML model(s) 835. If the feedback 870 is negative, the ML engine 830 can update the trained ML model(s) 835 via the further training 875 by weakening or removing the weights leading to these selection(s) of at least a subset of the output data 850 from the trained ML model(s) 835.

Figure 9:
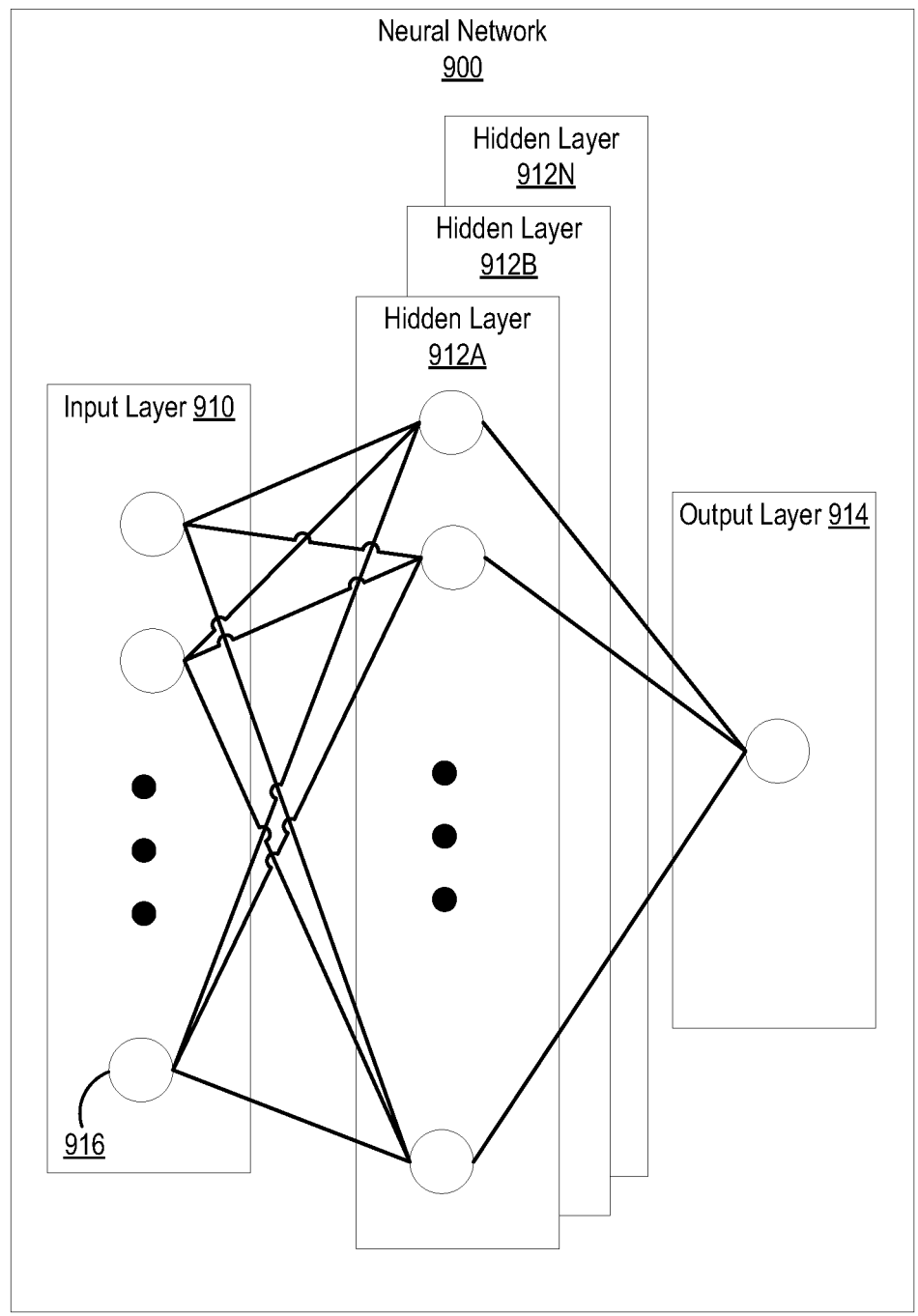
FIG. 9 is a block diagram illustrating an example of a neural network that can be used by a machine learning engine for automated payment selection, automated account selection, and/or automated account interaction.

FIG. 9 is a block diagram illustrating an example of a neural network 900 that can be used by a machine learning engine 830 for automated payment selection, automated account selection, and/or automated account interaction. Examples of the machine learning engine and/or the NN 900 include the ML engine 830, the trained ML model(s) 835, and combinations thereof. The neural network 900 can include any type of deep network, such as a convolutional neural network (CNN), an autoencoder, a deep belief net (DBN), a Recurrent Neural Network (RNN), a Generative Adversarial Networks (GAN), and/or other type of neural network.

An input layer 910 of the neural network 900 includes input data. The input data of the input layer 910 can include data representing, for example, the input data 805, the asset transaction data 810, the asset account data 815, information stored in the inter-account data structure(s) 135 about account(s), information stored in the account management data structure(s) 145 about account(s), information about account(s) managed by the account management server(s) 140, information about account(s) involved in interactions managed by the inter-account interaction server(s) 130, information stored in the inter-account data structure(s) 135 about transaction(s), information stored in the account management data structure(s) 145 about transaction(s), information about transaction(s) managed by the account management server(s) 140, information about transaction(s) involved in interactions managed by the inter-account interaction server(s) 130, the plurality of payment indications of the process 200, the plurality of asset transaction indications of the process 250, information about the plurality of user payment accounts of the process 200, the information about the plurality of asset accounts of the process 250, information about the plurality of user payment accounts 305 (e.g., donation account balances 320B-320N, locations 330B-330N), information about the recent transactions 315A, information about the recent transactions 315C, the selection criteria 380, information about the user's donation account 410 (e.g., the available balance 415, the donation score 420), information about the accounts mentioned in the personal transfer feed 425, information about transactions and/or transfers by accounts mentioned in the personal transfer feed 425, information about the user's account in FIG. 5A, information about the headphone purchase of FIG. 5A, information about the account of user Bob in FIG. 5A, information about the user's account in FIG. 5B, information about the grocery purchase of FIG. 5B, information about the account of BankX in FIG. 5B, information about the user's account of FIG. 6, information about at least one of the accounts of the other users mentioned in FIG. 6 (e.g., Claire, Paul, Mae, Bo, AirX, NYC Nurses, Joe, Al), information about transactions and/or transfers by accounts mentioned in the public transfer feed 630, information about the user's account in FIG. 7, information about the emergency fund 705 in FIG. 7, or a combination thereof. In an illustrative example, the input data of the input layer 910 includes at least a subset of the input data 805.

The neural network 900 includes multiple hidden layers 912A, 912B, through 912N. The hidden layers 912A, 912B, through 912N include "N" number of hidden layers, where "N" is an integer greater than or equal to one. The number of hidden layers can be made to include as many layers as needed for the given application. The neural network 900 further includes an output layer 914 that provides an output resulting from the processing performed by the hidden layers 912A, 912B, through 912N.

In some examples, the output layer 914 can provide an output that includes the output data 850, the selected asset transaction 860, the selected asset account 865, the selected transfer amount 867, the first payment indication of the process 200, the first payment of the process 200, the second user payment account of the process 200, the first asset transaction indication of the process 250, the first asset transaction of the process 250, the second asset account of the process 250, the selected transferor user payment account 360, the selected payment 375, an indication of the selected payment 375, the selected transferee user payment account 370, a selection of an account from one of the accounts mentioned in the personal transfer feed 425, a selection of a transaction from one of the transaction in a of one the tabs mentioned in the personal transfer feed 425, a selection of Bob's account in FIG. 5A, a selection of the headphone purchase in FIG. 5A, a selection of the 50% in FIG. 5A, a selection of BankX's account in FIG. 5B, a selection of the grocery purchase in FIG. 5B, a selection of the 25% in FIG. 5B, a selection of an account from one of the accounts mentioned in the public transfer feed 630, a selection of a transaction from one of the transaction in a of one the tabs mentioned in the public transfer feed 630, a selection of the emergency fund 705, a selection of the a transaction to be paid for using the emergency fund 705, or a combination thereof.

The neural network 900 is a multi-layer neural network of interconnected filters. Each filter can be trained to learn a feature representative of the input data. Information associated with the filters is shared among the different layers and each layer retains information as information is processed. In some cases, the neural network 900 can include a feed-forward network, in which case there are no feedback connections where outputs of the network are fed back into itself. In some cases, the network 900 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 910 can activate a set of nodes in the first hidden layer 912A. For example, as shown, each of the input nodes of the input layer 910 can be connected to each of the nodes of the first hidden layer 912A. The nodes of a hidden layer can transform the information of each input node by applying activation functions (e.g., filters) to this information. The information derived from the transformation can then be passed to and can activate the nodes of the next hidden layer 912B, which can perform their own designated functions. Example functions include convolutional functions, downscaling, upscaling, data transformation, and/or any other suitable functions. The output of the hidden layer 912B can then activate nodes of the next hidden layer, and so on. The output of the last hidden layer 912N can activate one or more nodes of the output layer 914, which provides a processed output image. In some cases, while nodes (e.g., node 916) in the neural network 900 are shown as having multiple output lines, a node has a single output and all lines shown as being output from a node represent the same output value.

In some cases, each node or interconnection between nodes can have a weight that is a set of parameters derived from the training of the neural network 900. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 910 using the different hidden layers 912A, 912B, through 912N in order to provide the output through the output layer 914.

Figure 10:
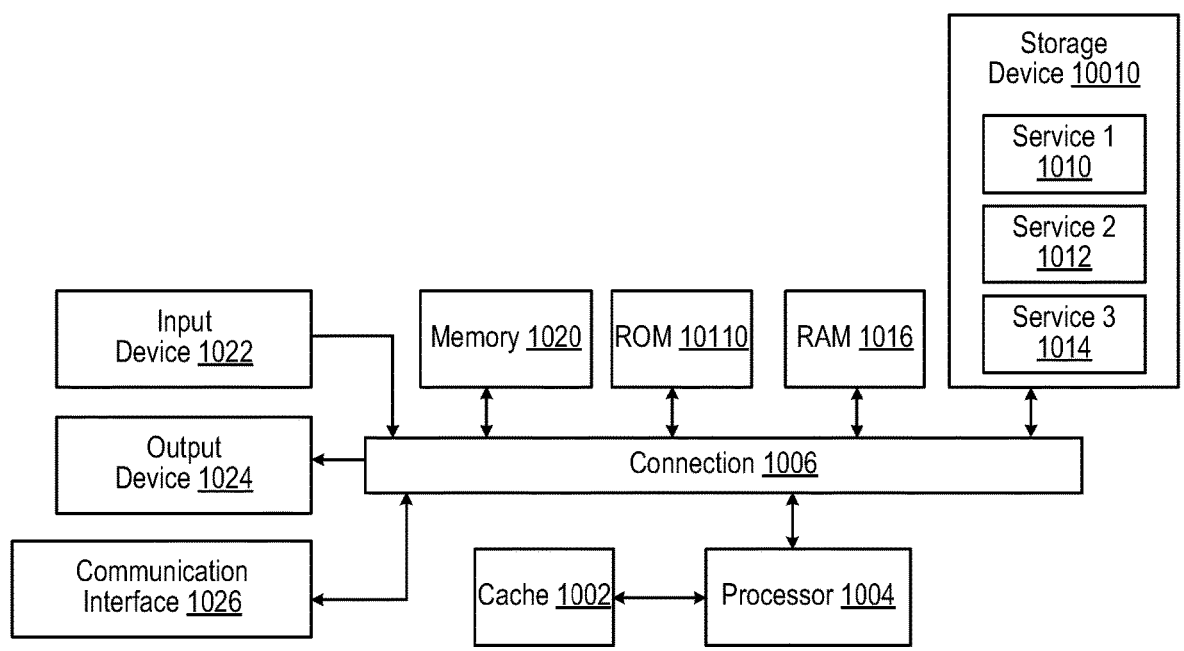
FIG. 10 shows an illustrative example of an environment in which various embodiments can be implemented.

FIG. 10 illustrates a computing system architecture 1000 including various components in electrical communication with each other using a connection 1006, such as a bus, in accordance with some implementations. Example system architecture 1000 includes a processing unit (CPU or processor) 1004 and a system connection 1006 that couples various system components including the system memory 1020, such as ROM 1018 and RAM 1016, to the processor 1004. The system architecture 1000 can include a cache 1002 of high-speed memory connected directly with, in close proximity to, or integrated as part of the processor 1004. The system architecture 1000 can copy data from the memory 1020 and/or the storage device 1008 to the cache 1002 for quick access by the processor 1004. In this way, the cache can provide a performance boost that avoids processor 1004 delays while waiting for data. These and other modules can control or be configured to control the processor 1004 to perform various actions.

Other system memory 1020 may be available for use as well. The memory 1020 can include multiple different types of memory with different performance characteristics. The processor 1004 can include any general purpose processor and a hardware or software service, such as service 1 1010, service 2 1012, and service 3 1014 stored in storage device 1008, configured to control the processor 1004 as well as a special-purpose processor where software instructions are incorporated into the actual processor design. The processor 1004 may be a completely self-contained computing system, containing multiple cores or processors, a bus, memory controller, cache, etc. A multi-core processor may be symmetric or asymmetric.

To enable user interaction with the computing system architecture 1000, an input device 1022 can represent any number of input mechanisms, such as a microphone for speech, a touch-sensitive screen for gesture or graphical input, keyboard, mouse, motion input, speech and so forth. An output device 1024 can also be one or more of a number of output mechanisms known to those of skill in the art. In some instances, multimodal systems can enable a user to provide multiple types of input to communicate with the computing system architecture 1000. The communications interface 1026 can generally govern and manage the user input and system output. There is no restriction on operating on any particular hardware arrangement and therefore the basic features here may easily be substituted for improved hardware or firmware arrangements as they are developed.

Storage device 1008 is a non-volatile memory and can be a hard disk or other types of computer readable media which can store data that are accessible by a computer, such as magnetic cassettes, flash memory cards, solid state memory devices, digital versatile disks, cartridges, RAMs 1016, ROM 1018, and hybrids thereof.

The storage device 1008 can include services 1010, 1012, 1014 for controlling the processor 1004. Other hardware or software modules are contemplated. The storage device 1008 can be connected to the system connection 1006. In one aspect, a hardware module that performs a particular function can include the software component stored in a computer-readable medium in connection with the necessary hardware components, such as the processor 1004, connection 1006, output device 1024, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Illustrative aspects of the disclosure include:

Aspect 1. A method of automated account interaction, the method comprising: identifying, based on asset account information accessed by one or more transaction service servers, a plurality of asset accounts associated with a plurality of users; receiving a plurality of asset transaction indications indicative of a plurality of asset transactions, wherein each of the plurality of asset transaction indications indicates that at least one of the plurality of asset accounts has performed one of the plurality of asset transactions; automatically selecting a first asset transaction indication from the plurality of asset transaction indications based on a first output of one or more trained machine learning (ML) models in response to input of the plurality of asset transaction indications into the one or more trained ML models, the first asset transaction indication indicating that a first asset account of the plurality of asset accounts has performed a first asset transaction of the plurality of asset transactions, the first asset account associated with a first user of the plurality of users; automatically selecting a second asset account from the plurality of asset accounts based on a second output of the one or more trained ML models in response to input of information about the plurality of asset accounts into the one or more trained ML models, the second asset account associated with a second user of the plurality of users, the second asset account having at least a first quantity of an asset; automatically transferring the first quantity of the asset from the second asset account to the first asset account in response to automatically selecting the first asset transaction indication and automatically selecting the second asset account; and automatically communicating a confirmation indicator, the confirmation indicator indicating that the first quantity of the asset has been transferred from the second asset account to the first asset account.

Aspect 2. The method of Aspect 1, wherein the first asset account performing the first asset transaction includes the first asset account transferring a second quantity of the asset.

Aspect 3. The method of Aspect 2, wherein the first quantity of the asset is equal to the second quantity of the asset.

Aspect 4. The method of any of Aspects 2 to 3, wherein the first quantity of the asset is less than the second quantity of the asset.

Aspect 5. The method of any of Aspects 2 to 4, wherein automatically selecting the first asset transaction indication from the plurality of asset transaction indications is based on the first asset transaction indication indicating that the second quantity of the asset is less than or equal to a maximum eligibility threshold.

Aspect 6. The method of any of Aspects 2 to 5, wherein automatically selecting the first asset transaction indication from the plurality of asset transaction indications is based on the first asset transaction indication indicating that the second quantity of the asset is greater than or equal to a minimum eligibility threshold.

Aspect 7. The method of any of Aspects 1 to 6, wherein automatically selecting the first asset transaction indication from the plurality of asset transaction indications is based on a random selection from among the plurality of asset transaction indications.

Aspect 8. The method of any of Aspects 1 to 7, wherein the first asset transaction pays for a commodity of a particular category, wherein automatically selecting the first asset transaction indication from the plurality of asset transaction indications is based on the particular category of the commodity, wherein the commodity is at least one of a good and a service.

Aspect 9. The method of any of Aspects 1 to 8, wherein the first asset account performs the first asset transaction within a particular time period, wherein automatically selecting the first asset transaction indication from the plurality of asset transaction indications is based on the particular time period.

Aspect 10. The method of any of Aspects 1 to 9, wherein automatically selecting the first asset transaction indication from the plurality of asset transaction indications is based on a second quantity of the asset having been previously transferred from an account associated with the first user to a third asset account of the plurality of asset accounts associated with a third user of the plurality of users, wherein the account associated with the first user is one of the first asset account and a fourth asset account of the plurality of asset accounts.

Aspect 11. The method of any of Aspects 1 to 10, further comprising: receiving a location of the first user from a first user device corresponding to the first user; receiving a location of the second user from a second user device corresponding to the second user; and identifying that the location of the first user and the location of the second user are within a shared region.

Aspect 12. The method of Aspect 11, wherein automatically selecting the first asset transaction indication from the plurality of asset transaction indications is based on the location of the first user and the location of the second user being within the shared region.

Aspect 13. The method of any of Aspects 11 to 12, wherein automatically selecting the second asset account from the plurality of asset accounts is based on the location of the first user and the location of the second user being within the shared region.

Aspect 14. The method of any of Aspects 1 to 13, wherein automatically selecting the second asset account from the plurality of asset accounts is based on a random selection from among the plurality of asset accounts.

Aspect 15. The method of any of Aspects 1 to 14, wherein automatically selecting the second asset account from the plurality of asset accounts is based on the second asset account having at least the first quantity of the asset.

Aspect 16. The method of any of Aspects 1 to 15, wherein automatically selecting the second asset account from the plurality of asset accounts is based on identifying that an account associated with the second user has performed a second asset transaction of the plurality of asset transactions, wherein the account associated with the second user is one of the second asset account or a third asset account of the plurality of asset accounts.

Aspect 17. The method of any of Aspects 1 to 16, further comprising: based on the first asset transaction indication and the second asset account being selected, using the first asset transaction and the second asset account to update the one or more trained ML models for use in identifying one or more additional asset transaction indications and one or more additional asset accounts for one or more additional transfers.

Aspect 18. The method of any of Aspects 1 to 17, further comprising: automatically identifying, using the one or more trained ML models, the first quantity of the asset to be at least a subset of an amount of the asset transferred during the first asset transaction.

Aspect 19. The method of any of Aspects 1 to 18, further comprising: generating a message identifying at least one of the first user and the second user, wherein the confirmation indicator includes the message.

Aspect 20. The method of any of Aspects 1 to 19, wherein the confirmation indicator refers to at least one of the first user and the second user using one or more anonymized identifiers.

Aspect 21. The method of any of Aspects 1 to 20, wherein communicating the confirmation indicator includes sending the confirmation indicator to at least one of a first user device corresponding to the first user and a second user device corresponding to the second user.

Aspect 22. The method of any of Aspects 1 to 21, wherein communicating the confirmation indicator includes publishing the confirmation indicator on a feed that is viewable by at least a subset of a plurality of user devices corresponding to the plurality of users.

Aspect 23. The method of Aspect 22, wherein publishing the confirmation indicator on the feed includes modifying a markup file corresponding to the feed to add the confirmation indicator, further comprising: serving the markup file to a viewer device of the plurality of user devices, wherein the feed is viewable by the viewer device upon transfer of the markup file to the viewer device.

Aspect 24. The method of any of Aspects 1 to 23, wherein transferring the first quantity of the asset from the second asset account to the first asset account occurs within a first time period, further comprising: calculating, based on a sum of the first quantity of the asset and a quantity of the asset corresponding to a plurality of other transfers of the asset occurring within the first time period, a first index representing a total quantity of the asset transferred within the first time period, wherein the confirmation indicator includes the first index.

Aspect 25. The method of Aspect 24, further comprising: generating a graph, wherein a first point on the graph corresponds to the first time period and identifies the first index, wherein the graph includes one or more additional points in addition to the first point, wherein each additional point of the one or more additional points corresponds to an additional time period other than the first time period and identifies an additional index representing a total quantity of the asset transferred within the additional time period, wherein communicating the confirmation indicator includes communicating the graph.

Aspect 26. The method of any of Aspects 1 to 25, wherein the second asset account corresponds to a financial institution.

Aspect 27. The method of any of Aspects 1 to 26, further comprising: initiating a line of communication between a first user device corresponding to the first user and a second user device corresponding to the second user in response to transferring the first quantity of the asset from the second asset account to the first asset account.

Aspect 28. The method of Aspect 27, wherein the line of communication includes transfer of one or more messages between the first user device and the second user device, the one or more messages including at least one of a string of text, an alphanumeric character, an image, a video, an audio clip, a motion graphic, an animation, an animated image, an icon, an emoji, and an emoticon.

Aspect 29. The method of Aspect 28, wherein the one or more messages are prepared before automatically selecting a first asset transaction indication and before automatically selecting the second asset account.

Aspect 30. A system for automated account interaction, comprising: a storage configured to store instructions; and a processor that executes the instructions, wherein execution of the instructions causes the processor to: identify, based on asset account information accessed by one or more transaction service servers, a plurality of asset accounts associated with a plurality of users, receive a plurality of asset transaction indications indicative of a plurality of asset transactions, wherein each asset transaction indication of the plurality of asset transaction indications indicates that at least one of the plurality of asset accounts has performed one of the plurality of asset transactions, automatically select a first asset transaction indication from the plurality of asset transaction indications based on a first output of one or more trained machine learning (ML) models in response to input of the plurality of asset transaction indications into the one or more trained ML models, the first asset transaction indication indicating that a first asset account of the plurality of asset accounts has performed a first asset transaction of the plurality of asset transactions, the first asset account associated with a first user of the plurality of users, automatically select a second asset account from the plurality of asset accounts based on a second output of the one or more trained ML models in response to input of information about the plurality of asset accounts into the one or more trained ML models, the second asset account associated with a second user of the plurality of users, the second asset account having at least a first quantity of the asset, automatically transfer the first quantity of the asset from the second asset account to the first asset account in response to automatically selecting the first asset transaction indication and automatically selecting the second asset account, and automatically communicate a confirmation indicator, the confirmation indicator indicating that the first quantity of the asset has been transferred from the second asset account to the first asset account.

Aspect 31. The system of Aspect 30, wherein the first asset account performing the first asset transaction includes the first asset account transferring a second quantity of the asset.

Aspect 32. The system of Aspect 31, wherein the first quantity of the asset is equal to the second quantity of the asset.

Aspect 33. The system of any of Aspects 31 to 32, wherein the first quantity of the asset is less than the second quantity of the asset.

Aspect 34. The system of any of Aspects 31 to 33, wherein automatically selecting the first asset transaction indication from the plurality of asset transaction indications is based on the first asset transaction indication indicating that the second quantity of the asset is less than or equal to a maximum eligibility threshold.

Aspect 35. The system of any of Aspects 31 to 34, wherein automatically selecting the first asset transaction indication from the plurality of asset transaction indications is based on the first asset transaction indication indicating that the second quantity of the asset is greater than or equal to a minimum eligibility threshold.

Aspect 36. The system of any of Aspects 30 to 35, wherein automatically selecting the first asset transaction indication from the plurality of asset transaction indications is based on a random selection from among the plurality of asset transaction indications.

Aspect 37. The system of any of Aspects 30 to 36, wherein the first asset transaction pays for a commodity of a particular category, wherein execution of the instructions causes the processor to further: automatically select the first asset transaction indication from the plurality of asset transaction indications is based on the particular category of the commodity, and the commodity is at least one of a good and a service.

Aspect 38. The system of any of Aspects 30 to 37, wherein the first asset account performs the first asset transaction within a particular time period and the first asset account performs the first asset transaction within a particular time period.

Aspect 39. The system of any of Aspects 30 to 38, wherein automatically selecting the first asset transaction indication from the plurality of asset transaction indications is based on a second quantity of the asset having been previously transferred from an account associated with the first user to a third asset account of the plurality of asset accounts associated with a third user of the plurality of users and automatically selecting the first asset transaction indication from the plurality of asset transaction indications is based on a second quantity of the asset having been previously transferred from an account associated with the first user to a third asset account of the plurality of asset accounts associated with a third user of the plurality of users.

Aspect 40. The system of any of Aspects 30 to 39, wherein execution of the instructions causes the processor to further: receive a location of the first user from a first user device corresponding to the first user; receive a location of the second user from a second user device corresponding to the second user; and identify that the location of the first user and the location of the second user are within a shared region.

Aspect 41. The system of Aspect 40, wherein automatically selecting the first asset transaction indication from the plurality of asset transaction indications is based on the location of the first user and the location of the second user being within the shared region.

Aspect 42. The system of any of Aspects 40 to 41, wherein automatically selecting the second asset account from the plurality of asset accounts is based on the location of the first user and the location of the second user being within the shared region.

Aspect 43. The system of any of Aspects 30 to 42, wherein automatically selecting the second asset account from the plurality of asset accounts is based on a random selection from among the plurality of asset accounts.

Aspect 44. The system of any of Aspects 30 to 43, wherein automatically selecting the second asset account from the plurality of asset accounts is based on the second asset account having at least the first quantity of the asset.

Aspect 45. The system of any of Aspects 30 to 44, wherein automatically selecting the second asset account from the plurality of asset accounts is based on identifying that an account associated with the second user has performed a second asset transaction of the plurality of asset transactions and automatically selecting the second asset account from the plurality of asset accounts is based on identifying that an account associated with the second user has performed a second asset transaction of the plurality of asset transactions.

Aspect 46. The system of any of Aspects 30 to 45, wherein execution of the instructions causes the processor to further: based on the first asset transaction indication and the second asset account being selected, use the first asset transaction and the second asset account to update the one or more trained ML models for use in identifying one or more additional asset transaction indications and one or more additional asset accounts for one or more additional transfers.

Aspect 47. The system of any of Aspects 30 to 46, wherein execution of the instructions causes the processor to further: automatically identifying, using the one or more trained ML models, the first quantity of the asset to be at least a subset of an amount of the asset transferred during the first asset transaction.

Aspect 48. The system of any of Aspects 30 to 47, wherein execution of the instructions causes the processor to further: generate a message identifying at least one of the first user and the second user, wherein the confirmation indicator includes the message.

Aspect 49. The system of any of Aspects 30 to 48, wherein the confirmation indicator refers to at least one of the first user and the second user using one or more anonymized identifiers.

Aspect 50. The system of any of Aspects 30 to 49, wherein communicating the confirmation indicator includes sending the confirmation indicator to at least one of a first user device corresponding to the first user and a second user device corresponding to the second user.

Aspect 51. The system of any of Aspects 30 to 50, wherein communicating the confirmation indicator includes publishing the confirmation indicator on a feed that is viewable by at least a subset of a plurality of user devices corresponding to the plurality of users.

Aspect 52. The system of any of Aspect 51, wherein publishing the confirmation indicator on the feed includes modifying a markup file corresponding to the feed to add the confirmation indicator, wherein execution of the instructions causes the processor to further: serve the markup file to a viewer device of the plurality of user devices, wherein the feed is viewable by the viewer device upon transfer of the markup file to the viewer device.

Aspect 53. The system of any of Aspects 30 to 52, wherein transferring the first quantity of the asset from the second asset account to the first asset account occurs within a first time period, wherein execution of the instructions causes the processor to further: calculate, based on a sum of the first quantity of the asset and a quantity of the asset corresponding to a plurality of other transfers of the asset occurring within the first time period, a first index representing a total quantity of the asset transferred within the first time period, wherein the confirmation indicator includes the first index.

Aspect 54. The system of Aspect 53, wherein execution of the instructions causes the processor to further: generate a graph, wherein a first point on the graph corresponds to the first time period and identifies the first index, wherein the graph includes one or more additional points in addition to the first point, wherein each additional point of the one or more additional points corresponds to an additional time period other than the first time period and identifies an additional index representing a total quantity of the asset transferred within the additional time period, wherein communicating the confirmation indicator includes communicating the graph.

Aspect 55. The system of any of Aspects 30 to 54, wherein the second asset account corresponds to a financial institution.

Aspect 56. The system of any of Aspects 30 to 55, wherein the processor is configured to execute the instructions and cause the processor to: initiate a line of communication between a first user device corresponding to the first user and a second user device corresponding to the second user in response to transfer the first quantity of the asset from the second asset account to the first asset account.

Aspect 57. The system of Aspect 56, wherein the line of communication includes transfer of audio recorded at one of the first user device and the second user device to another of the first user device and the second user device.

Aspect 58. The system of any of Aspects 56 to 57, wherein the line of communication includes transfer of video recorded at one of the first user device and the second user device to another of the first user device and the second user device.

Aspect 59. The system of any of Aspects 30 to 58, wherein the line of communication includes transfer of one or more messages between the first user device and the second user device, the one or more messages including at least one of a string of text, an alphanumeric character, an image, a video, an audio clip, a motion graphic, an animation, an animated image, an icon, an emoji, and an emoticon.

Aspect 60. The system of Aspect 59, wherein the one or more messages are prepared before automatically selecting a first asset transaction indication and before automatically selecting the second asset account.

Aspect 61. A non-transitory computer readable storage medium having embodied thereon a program, wherein the program is executable by a processor to perform a method of automated account interaction, the method comprising: identifying, based on asset account information accessed by one or more payment service servers, a plurality of asset accounts associated with a plurality of users; receiving a plurality of asset transaction indications indicative of a plurality of asset transactions, wherein each asset transaction indication of the plurality of asset transaction indications indicates that at least one of the plurality of asset accounts has performed one of the plurality of asset transactions; automatically selecting a first asset transaction indication from the plurality of asset transaction indications based on a first output of one or more trained machine learning (ML) models in response to input of the plurality of asset transaction indications into the one or more trained ML models, the first asset transaction indication indicating that a first asset account of the plurality of asset accounts has performed a first asset transaction of the plurality of asset transactions, the first asset account associated with a first user of the plurality of users; automatically selecting a second asset account from the plurality of asset accounts based on a second output of the one or more trained ML models in response to input of information about the plurality of asset accounts into the one or more trained ML models, the second asset account associated with a second user of the plurality of users, the second asset account having at least a first quantity of the asset; automatically transferring the first quantity of the asset from the second asset account to the first asset account in response to automatically selecting the first asset transaction indication and automatically selecting the second asset account; and automatically communicating an indicator, the confirmation indicator indicating that the first quantity of the asset has been transferred from the second asset account to the first asset account.

Aspect 62: The non-transitory computer-readable medium of Aspect 61, further comprising any of Aspects 2 to 29 and/or any of Aspects 31 to 60.

Aspect 63: An apparatus for image processing, the apparatus comprising: means for identifying, based on asset account information accessed by one or more transaction service servers, a plurality of asset accounts associated with a plurality of users; means for receiving a plurality of asset transaction indications indicative of a plurality of asset transactions, wherein each of the plurality of asset transaction indications indicates that at least one of the plurality of asset accounts has performed one of the plurality of asset transactions; means for automatically selecting a first asset transaction indication from the plurality of asset transaction indications based on a first output of one or more trained machine learning (ML) models in response to input of the plurality of asset transaction indications into the one or more trained ML models, the first asset transaction indication indicating that a first asset account of the plurality of asset accounts has performed a first asset transaction of the plurality of asset transactions, the first asset account associated with a first user of the plurality of users; means for automatically selecting a second asset account from the plurality of asset accounts based on a second output of the one or more trained ML models in response to input of information about the plurality of asset accounts into the one or more trained ML models, the second asset account associated with a second user of the plurality of users, the second asset account having at least a first quantity of an asset; means for automatically transferring the first quantity of the asset from the second asset account to the first asset account in response to automatically selecting the first asset transaction indication and automatically selecting the second asset account; and means for automatically communicating a confirmation indicator, the confirmation indicator indicating that the first quantity of the asset has been transferred from the second asset account to the first asset account.

Aspect 64: The apparatus of Aspect 63, further comprising any of Aspects 2 to 29 and/or any of Aspects 31 to 60.

What is claimed is:

1. A method of automated interaction, the method comprising:
    training a neural network using training data, wherein the training data is associated with historical user selections for historical interactions between pairs of users, wherein training includes setting one or more numeric weights of the neural network, and wherein the one or more numeric weights are associated with respective connections between respective pairs of nodes in the trained neural network;
    receiving information about a plurality of accounts and corresponding calendars, wherein the plurality of accounts include a user account associated with a user calendar and an agent account associated with an agent calendar, wherein the information identifies associations between the plurality of accounts and a plurality of categories of goods;
    receiving an indication requesting an interaction to involve a user associated with the user account;
    dynamically analyzing the information using the trained neural network in real-time as the information continues to be received, wherein the trained neural network selects an agent associated with the agent account for the interaction based on the analysis indicating that the user calendar and the agent calendar have matching availability for a calendar event and that the user account and the agent account are both associated with a specific category of goods;

scheduling the interaction between the user and the agent for the calendar event;

initiating the interaction between the user and the agent as scheduled, wherein the interaction is associated with the specific category of goods;

dynamically receiving feedback associated with the interaction as the interaction occurs, wherein the feedback is either positive or negative with respect to the selection of the agent;

automatically updating the trained neural network based on the feedback as the feedback is received, wherein updating includes adjusting the one or more numeric weights associated with the selection of the agent based on the feedback, wherein the modification to the one or more numeric weights increases or decreases the one or more numeric weights based on whether the feedback is positive or negative, and wherein updating the trained neural network improves how the trained neural network performs further agent selections; and selecting a second agent using the updated neural network.

2. The method of claim 1, further comprising:
scheduling a time for a transaction between the user and the agent, wherein scheduling the interaction between the user and the agent is based on the time scheduled for the transaction.

3. The method of claim 1, wherein the trained neural network selecting the agent for the interaction includes the trained neural network selecting the agent account associated with the agent from the plurality of accounts.

4. The method of claim 1, wherein scheduling the interaction includes sending an invitation to join the interaction.

5. The method of claim 1, wherein initiating the interaction includes initiating a connection between a user device associated with the user account and an agent device associated with the agent at a time scheduled for the interaction, wherein the interaction between the user and the agent is configured to use the connection.

6. The method of claim 1, wherein dynamically analyzing the information using the trained neural network includes dynamically analyzing at least the user calendar and the agent calendar using the trained neural network.

7. The method of claim 1, wherein the agent represents an organization.

8. The method of claim 1, wherein initiating the interaction includes presenting communication options for the interaction and receiving a communication option selection of one of the communication options to use in the interaction, wherein the communication options include at least one of a custom response or an interactive option.

9. The method of claim 1, wherein initiating the interaction includes presenting communication options for the interaction and receiving a communication option selection of one of the communication options to use in the interaction, wherein the communication options include a predetermined response that is prepared before the agent is selected.

10. The method of claim 1, wherein initiating the interaction includes presenting communication options for the interaction and receiving a communication option selection of one of the communication options to use in the interaction, wherein the communication options include a predetermined response that is prepared after the agent is selected.

11. The method of claim 1, wherein the indication identifies the specific category of goods that the interaction is to be associated with.

12. The method of claim 1, wherein the user account and the agent account both being associated with the specific category of goods is based on the user account and the agent account both being associated with a good or service, wherein the good or service belongs to the specific category of goods.

13. The method of claim 1, wherein the indication identifies a transaction that the interaction is to be associated with, wherein the trained neural network selects the agent based on the transaction.

14. The method of claim 1, wherein the interaction between the user and the agent also involves an automated assistant.

15. The method of claim 1, further comprising:
generating a personalized message that is personalized to be associated with the interaction between the user and the agent; and
sending the personalized message.

16. The method of claim 1, further comprising:
providing a feed indicative of a plurality of interactions; and
updating the feed to add, to the feed, an interaction indication of the interaction between the user and the agent.

17. The method of claim 1, further comprising:
transferring a digital asset between the user and the agent as part of the interaction.

18. A system for automated interaction, the system comprising:
at least one memory; and
at least one processor coupled to the at least one memory and configured to:
train a neural network using training data, wherein the training data is associated with historical user selections for historical interactions between pairs of users, wherein training includes setting one or more numeric weights of the neural network, and wherein the one or more numeric weights are associated with respective connections between respective pairs of nodes in the trained neural network;
receive information about a plurality of accounts and corresponding calendars, wherein the plurality of accounts include a user account associated with a user calendar and an agent account associated with an agent calendar, wherein the information identifies associations between the plurality of accounts and a plurality of categories of goods;
receive an indication requesting an interaction to involve a user associated with the user account;
dynamically analyze the information using the trained neural network in real-time as the information continues to be received, wherein the trained neural network selects an agent associated with the agent account for the interaction based on the analysis indicating that the user calendar and the agent calendar have matching availability for a calendar event and that the user account and the agent account are both associated with a specific category of goods;
schedule the interaction between the user and the agent for the calendar event;

initiate the interaction between the user and the agent as scheduled, wherein the interaction is associated with the specific category of goods;

dynamically receive feedback associated with the interaction as the interaction occurs, wherein the feedback is either positive or negative with respect to the selection of the agent;

automatically update the trained neural network based on the feedback as the feedback is received, wherein updating includes adjusting the one or more numeric weights associated with the selection of the agent based on the feedback, wherein the modification to the one or more numeric weights increases or decreases the one or more numeric weights based on whether the feedback is positive or negative, and wherein updating the trained neural network improves how the trained neural network performs further agent selections; and select a agent using the updated neural network.

19. The system of claim 18, wherein the at least one processor is configured to:

schedule a time for a transaction between the user and the agent, wherein scheduling the interaction between the user and the agent is based on the time scheduled for the transaction.

20. The system of claim 18, wherein the trained neural network selecting the agent for the interaction includes the trained neural network selecting the agent account associated with the agent from the plurality of accounts.

21. The system of claim 18, wherein scheduling the interaction includes sending an invitation to join the interaction.

22. The system of claim 18, wherein, to initiate the interaction, the at least one processor is configured to:

initiate a connection between a user device associated with the user account and an agent device associated with the agent at a time scheduled for the interaction, wherein the interaction between the user and the agent is configured to use the connection.

23. The system of claim 18, wherein dynamically analyzing the information using the trained neural network includes dynamically analyzing at least the user calendar and the agent calendar using the trained neural network.

24. The system of claim 18, wherein the agent represents an organization.

25. The system of claim 18, wherein initiating the interaction includes presenting communication options for the interaction and receiving a communication option selection of one of the communication options to use in the interaction, wherein the communication options include at least one of a custom response or an interactive option.

26. The system of claim 18, wherein initiating the interaction includes presenting communication options for the interaction and receiving a communication option selection of one of the communication options to use in the interaction, wherein the communication options include a predetermined response that is prepared before the agent is selected.

27. The system of claim 18, wherein initiating the interaction includes presenting communication options for the interaction and receiving a communication option selection of one of the communication options to use in the interaction, wherein the communication options include a predetermined response that is prepared after the agent is selected.

28. The system of claim 18, wherein the indication identifies the specific category of goods that the interaction is to be associated with.

29. A non-transitory computer-readable storage medium having embodied thereon a program, wherein the program is executable by a processor to perform a method of automated interaction, the method comprising:

training a neural network using training data, wherein the training data is associated with historical user selections for historical interactions between pairs of users, wherein training includes setting one or more numeric weights of the neural network, and wherein the one or more numeric weights are associated with respective connections between respective pairs of nodes in the trained neural network;

receiving information about a plurality of accounts and corresponding calendars, wherein the plurality of accounts include a user account associated with a user calendar and an agent account associated with an agent calendar, wherein the information identifies associations between the plurality of accounts and a plurality of categories of goods;

receiving an indication requesting an interaction to involve a user associated with the user account;

dynamically analyzing the information using the trained neural network in real-time as the information continues to be received, wherein the trained neural network selects an agent associated with the agent account for the interaction based on the analysis indicating that the user calendar and the agent calendar have matching availability for a calendar event and that the user account and the agent account are both associated with a specific category of goods;

scheduling the interaction between the user and the agent for the calendar event;

initiating the interaction between the user and the agent as scheduled, wherein the interaction is associated with the specific category of goods;

dynamically receiving feedback associated with the interaction as the interaction occurs, wherein the feedback is either positive or negative with respect to the selection of the agent;

automatically updating the trained neural network based on the feedback as the feedback is received, wherein updating includes adjusting the one or more numeric weights associated with the selection of the agent based on the feedback, wherein the modification to the one or more numeric weights increases or decreases the one or more numeric weights based on whether the feedback is positive or negative, and wherein updating the trained neural network improves how the trained neural network performs further agent selections; and selecting a second agent using the updated neural network.

30. The system of claim 18, wherein the user account and the agent account both being associated with the specific category of goods is based on the user account and the agent account both being associated with a good or service, wherein the good or service belongs to the specific category of goods.

31. The system of claim 18, wherein the indication identifies a transaction that the interaction is to be associated with, wherein the trained neural network selects the agent based on the transaction.

32. The system of claim 18, wherein the interaction between the user and the agent also involves an automated assistant.

33. The system of claim 18, wherein the at least one processor is configured to:

generate a personalized message that is personalized to be associated with the interaction between the user and the agent; and send the personalized message.

34. The system of claim 18, wherein the at least one processor is configured to:

provide a feed indicative of a plurality of interactions; and update the feed to add, to the feed, an interaction indication of the interaction between the user and the agent.

35. The system of claim 18, wherein the at least one processor is configured to:

transfer a digital asset between the user and the agent as part of the interaction.

36. The non-transitory computer-readable storage medium of claim 29, further comprising:

scheduling a time for a transaction between the user and the agent, wherein scheduling the interaction between the user and the agent is based on the time scheduled for the transaction.

37. The non-transitory computer-readable storage medium of claim 29, wherein the trained neural network selecting the agent for the interaction includes the trained neural network selecting the agent account associated with the agent from the plurality of accounts.

38. The non-transitory computer-readable storage medium of claim 29, wherein scheduling the interaction includes sending an invitation to join the interaction.

39. The non-transitory computer-readable storage medium of claim 29, wherein initiating the interaction includes initiating a connection between a user device associated with the user account and an agent device associated with the agent at a time scheduled for the interaction, wherein the interaction between the user and the agent is configured to use the connection.

40. The non-transitory computer-readable storage medium of claim 29, wherein dynamically analyzing the information using the trained neural network includes dynamically analyzing at least the user calendar and the agent calendar using the trained neural network.

41. The non-transitory computer-readable storage medium of claim 29, wherein the agent represents an organization.

42. The non-transitory computer-readable storage medium of claim 29, wherein initiating the interaction includes presenting communication options for the interaction and receiving a communication option selection of one of the communication options to use in the interaction, wherein the communication options include at least one of a custom response or an interactive option.

43. The non-transitory computer-readable storage medium of claim 29, wherein initiating the interaction includes presenting communication options for the interaction and receiving a communication option selection of one of the communication options to use in the interaction, wherein the communication options include a predetermined response that is prepared before the agent is selected.

44. The non-transitory computer-readable storage medium of claim 29, wherein initiating the interaction includes presenting communication options for the interaction and receiving a communication option selection of one of the communication options to use in the interaction, wherein the communication options include a predetermined response that is prepared after the agent is selected.

45. The non-transitory computer-readable storage medium of claim 29, wherein the indication identifies the specific category of goods that the interaction is to be associated with.

46. The non-transitory computer-readable storage medium of claim 29, wherein the user account and the agent account both being associated with the specific category of goods is based on the user account and the agent account both being associated with a good or service, wherein the good or service belongs to the specific category of goods.

47. The non-transitory computer-readable storage medium of claim 29, wherein the indication identifies a transaction that the interaction is to be associated with, wherein the trained neural network selects the agent based on the transaction.

48. The non-transitory computer-readable storage medium of claim 29, wherein the interaction between the user and the agent also involves an automated assistant.

49. The non-transitory computer-readable storage medium of claim 29, further comprising:

generating a personalized message that is personalized to be associated with the interaction between the user and the agent; and sending the personalized message.

50. The non-transitory computer-readable storage medium of claim 29, further comprising:

providing a feed indicative of a plurality of interactions; and updating the feed to add, to the feed, an interaction indication of the interaction between the user and the agent.

51. The non-transitory computer-readable storage medium of claim 29, further comprising:

transferring a digital asset between the user and the agent as part of the interaction.

\* \* \* \* \*